(12) United States Patent
Chang et al.

(10) Patent No.: US 8,868,389 B2
(45) Date of Patent: Oct. 21, 2014

(54) COMPUTER-IMPLEMENTED SIMULATION METHOD AND NON-TRANSITORY COMPUTER MEDIUM FOR USE IN MOLDING PROCESS, AND MOLDING SYSTEM USING THE SAME

(71) Applicant: Coretech System Co., Ltd., Hsinchu County (TW)

(72) Inventors: Rong Yeu Chang, Hsinshu County (TW); Chia Hsiang Hsu, Hsinchu County (TW); Chuan Wei Chang, Hsinchu County (TW); Hsien Sen Chiu, Hsinchu County (TW); Chao Tsai Huang, Hsinchu County (TW)

(73) Assignee: Coretech System Co., Ltd., Hsinchu County (TW)

( * ) Notice: Subject to any disclaimer, the term of this patent is extended or adjusted under 35 U.S.C. 154(b) by 0 days.

(21) Appl. No.: 14/156,687

(22) Filed: Jan. 16, 2014

(65) Prior Publication Data

US 2014/0200710 A1    Jul. 17, 2014

Related U.S. Application Data

(60) Provisional application No. 61/753,518, filed on Jan. 17, 2013.

(51) Int. Cl.
| | |
|---|---|
| *G06G 7/50* | (2006.01) |
| *B29C 45/26* | (2006.01) |
| *G06F 17/50* | (2006.01) |
| *B29C 45/76* | (2006.01) |
| *B29L 31/30* | (2006.01) |

(52) U.S. Cl.
CPC ........... *B29C 45/26* (2013.01); *G06F 17/5009* (2013.01); *B29C 45/7693* (2013.01); *B29L 2031/3044* (2013.01)
USPC ............................................................ 703/9

(58) Field of Classification Search
USPC ............................................................ 703/9
See application file for complete search history.

(56) References Cited

PUBLICATIONS

Rännar (On Optimization of Injection Molding Cooling): Thesis for the degree doktor ingeniør; Trondheim, Apr. 2008; Norwegian University of Science and Technology, Faculty of Engineering Science and Technology, Department of Engineering Design and Materials; 150 pages.*
Chou et al. 3D Numerical Simulation Investigating the Effect of Volumetric Flow Rate on Core Deflection; ANTEC 2008; pp. 1-5.*
Rong-Yeu Chang et al., Numerical simulation of mold filling in injection molding using a three-dimensional finite volume approach, International Journal for Numerical Methods in Fluids, vol. 37, pp. 125-148, 2001.

\* cited by examiner

*Primary Examiner* — Hugh Jones
(74) *Attorney, Agent, or Firm* — Ming Chow; Sinorica, LLC

(57) ABSTRACT

A computer-implemented simulation method for use in molding process by a computer processor includes specifying a simulating domain having a mold cavity configured to connect a tube of a molding machine, creating a mesh by dividing at least part of the simulating domain, generating at least one flow parameter of a molding material in the tube, specifying boundary conditions of the mesh by taking into consideration the at least one flow parameter of the molding material, and simulating a molding process of the molding material that is injected into the mold cavity by using the boundary conditions to generate a plurality of molding conditions.

14 Claims, 20 Drawing Sheets

COMPUTER-IMPLEMENTED SIMULATION METHOD AND NON-TRANSITORY COMPUTER MEDIUM FOR USE IN MOLDING PROCESS, AND MOLDING SYSTEM USING THE SAME

The current application claims a priority to the U.S. Provisional Patent application Ser. No. 61/753,518 filed on Jan. 17, 2013.

TECHNICAL FIELD

The present disclosure relates to a computer-implemented simulation method and non-transitory computer medium for use in molding process, and a molding system using the same.

DISCUSSION OF THE BACKGROUND

In general, the setting of molding conditions in a molding machine, such as an injection molding machine or a transfer molding machine, requires a large number of trial molding operations and a long setting time because the setting process greatly depends on the know-how and experience of an operator, and various physical values affect one another as well.

Therefore, the operator performs a virtual molding, i.e., computer-implemented simulation, by use of CAE (Computer-Assisted Engineering) for molding process, and the molding conditions are then set based on the virtual molding. When using CAE in virtual molding, phenomena will occur in a mold cavity within a short period of time; i.e., the result of simulation on resin temperature, pressure, shear rate, etc. can be reflected in molded products.

Therefore, if phenomena occurring within a mold cavity can be grasped accurately, using CAE may enable optimization of molding conditions and stable molding of non-defective products. As described above, since CAE can simulate all phenomena occurring within the mold cavity, if analysis accuracy is high, CAE serves as an assisting means suitable for optimization of the molding conditions.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY

The present disclosure provides a computer-implemented simulation method and non-transitory computer medium for use in molding process, and a molding system using the same.

In accordance with some embodiments of the present disclosure, a computer-implemented simulation method for use in molding process by a computer processor includes specifying a simulating domain having a mold cavity configured to connect a tube of a molding machine, creating a mesh by dividing at least part of the simulating domain, generating at least one flow parameter of a molding material in the tube, specifying boundary conditions of the mesh by taking into consideration the at least one flow parameter of the molding material, and simulating a molding process of the molding material that is injected into the mold cavity by using the boundary conditions to generate a plurality of molding conditions.

In accordance with some embodiments of the present disclosure, a non-transitory computer medium contains computer instructions stored therein for causing a computer processor to perform operations for use in molding process simulation, and the operations comprise specifying a simulating domain having a mold cavity configured to connect a tube of a molding machine, creating a mesh by dividing at least part of the simulating domain, generating at least one flow parameter of a molding material in the tube, specifying boundary conditions of the mesh by taking into consideration the at least one flow parameter of the molding material, and simulating a molding process of the molding material that is injected into the mold cavity by using the boundary conditions to generate a plurality of molding conditions.

In accordance with some embodiments of the present disclosure, a molding system comprises a mold having a mold cavity, a molding machine having a tube with a pusher therein configured to push a molding material into the mold cavity, and a computer processor associated with the molding machine. The computer processor is configured to perform operations for a molding process simulation, and the operations comprise specifying a simulating domain having the mold cavity, creating a mesh by dividing at least part of the simulating domain, generating at least one flow parameter of the molding material in the tube, specifying boundary conditions of the mesh by taking into consideration the at least one flow parameter of the molding material, and simulating a molding process of the molding material that is injected into the mold cavity by using the boundary conditions to generate a plurality of molding conditions.

In some embodiments, the at least one flow parameter of the molding material in the tube is generated by taking into consideration the dynamic movement of the pusher in the tube, the volume variation of the molding material in the tube, or the combination thereof; and, the at least one flow parameter of the molding material in the tube is then used to specify the boundary conditions of the simulation domain.

In some embodiments, the generating of the at least one flow parameter of the molding material in the tube includes calculating a dynamic variation for a filling rate of the molding material that is injected into the mold cavity, and the filling rate of the molding material is used to calculate a flow velocity of the molding material that is injected into the mold cavity from the tube.

In some embodiments, the filling rate of the molding material (the amount of the molding material transferred into the mold cavity by the pusher in the tube) depends on the dynamic movement of the pusher. In some embodiments, the present disclosure acquires a measured waveform on the dynamic movement of the pusher to simulate the molding phenomena of the molding material injected into the mold cavity by the pusher in the tube.

In addition, the filling rate of the molding material (the amount of the molding material transferred into the mold cavity by the pusher in the tube) also depends on the volume variation of the molding material with respect to the temperature and pressure. In some embodiments, the volume variation for calculating the at least one flow parameter of the molding material is a compressibility of the molding material with respect to the pressure, a shrinkage of the molding material with respect to the temperature, or the combination thereof.

The foregoing has outlined rather broadly the features and technical advantages of the present disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "some embodiments," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a computer-implemented simulation method and non-transitory computer medium for use in molding process, and a molding system using the same. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

In some embodiments of the present disclosure, the molding process can be an injection molding process for molding thermoplastic resins or a transfer molding process for molding thermosetting resins. The following description uses the injection molding process for molding thermoplastic resins as examples, but the disclosure is not limited to the examples.

Figure 1:
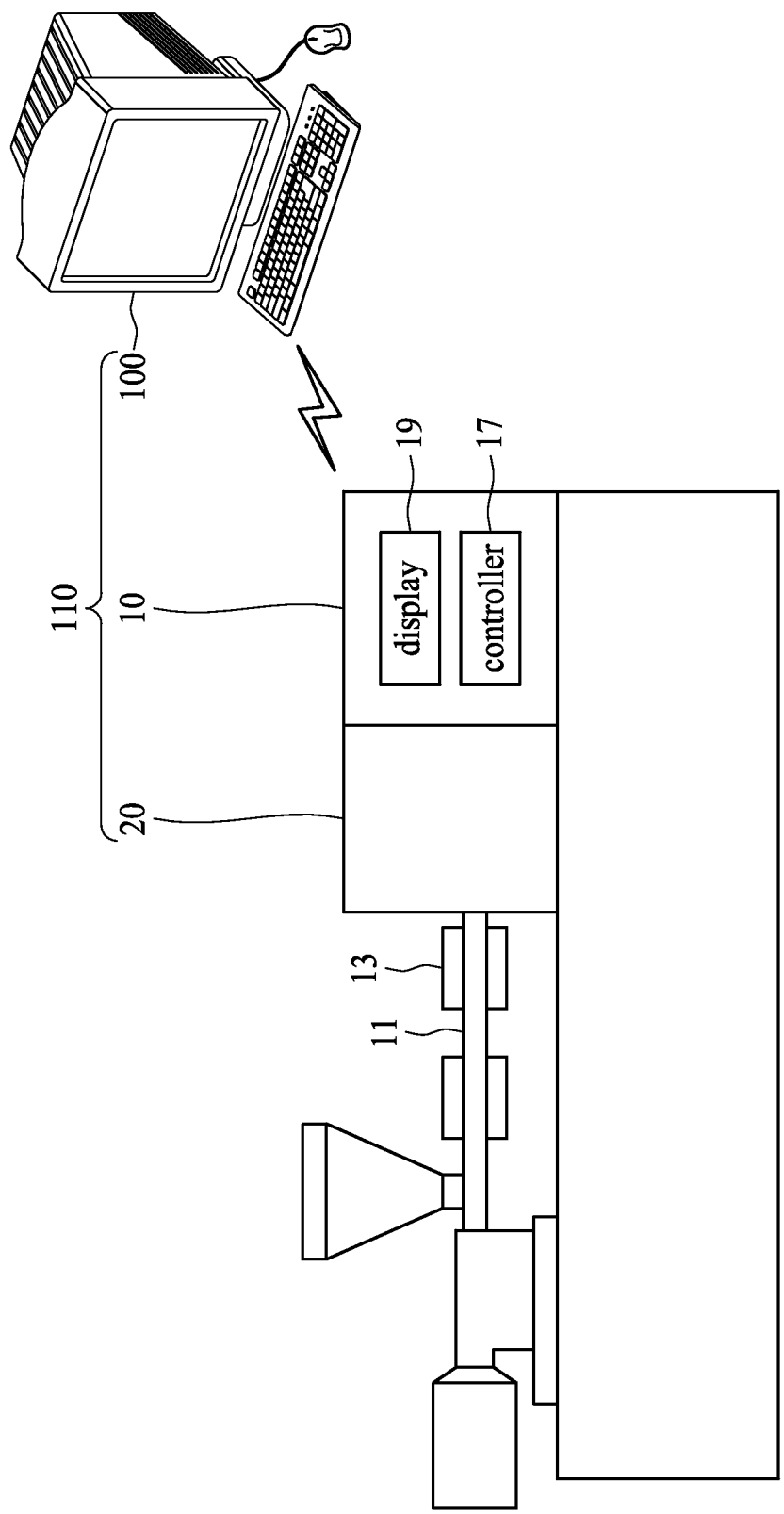
FIG. 1 is a schematic view of an injection molding system in accordance with various embodiments of the present disclosure.

FIG. 1 is a schematic view of an injection molding system 110 in accordance with various embodiments of the present disclosure. The injection molding system 110 comprises an injection machine 10, a mold 20 disposed on the injection machine 10, and a computer 100 associated with the injection molding machine 10, wherein the injection machine 10 has a controller 17 and a display 19; and the computer 100 is configured to execute a CAE simulation software and transmit the simulation result to the controller 17 through an association therebetween such as a hard wire connection or a wireless coupling.

Figure 2:
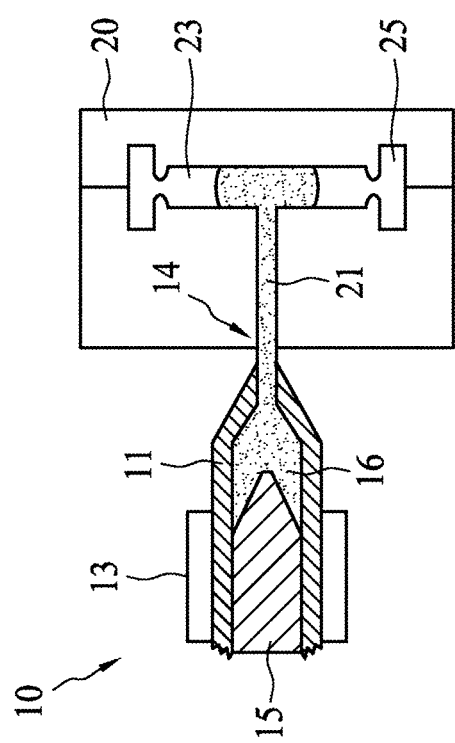
FIG. 2 is a schematic view of the mold in FIG. 1.

FIG. 2 is a schematic view of the mold 20 in FIG. 1. The mold 20 includes a sprue 21, a runner 23 and a mold cavity 25. The injection molding machine 10 includes a tube (barrel) 11, a temperature-controlling devices 13 such as heaters or cooler configured to control the temperature of the barrel 11, and a pusher (screw) 15 positioned in the barrel 11 for feeding a molding material 16 such as thermoplastic resins into the mold cavity 25 of the mold 20 through a nozzle 14 between the mold 20 and the injection molding machine 10.

The injection molding machine 10 is equipped with sensors for sensing the velocity of the screw 15, the pressure of the barrel 11 in the filling stage (filling pressure) and the temperature of the barrel 11 in the filling stage (filling temperature); and, the computer 100 is configured to acquire the velocity and pressure data from the controller 17 through the association therebetween.

Figure 3:
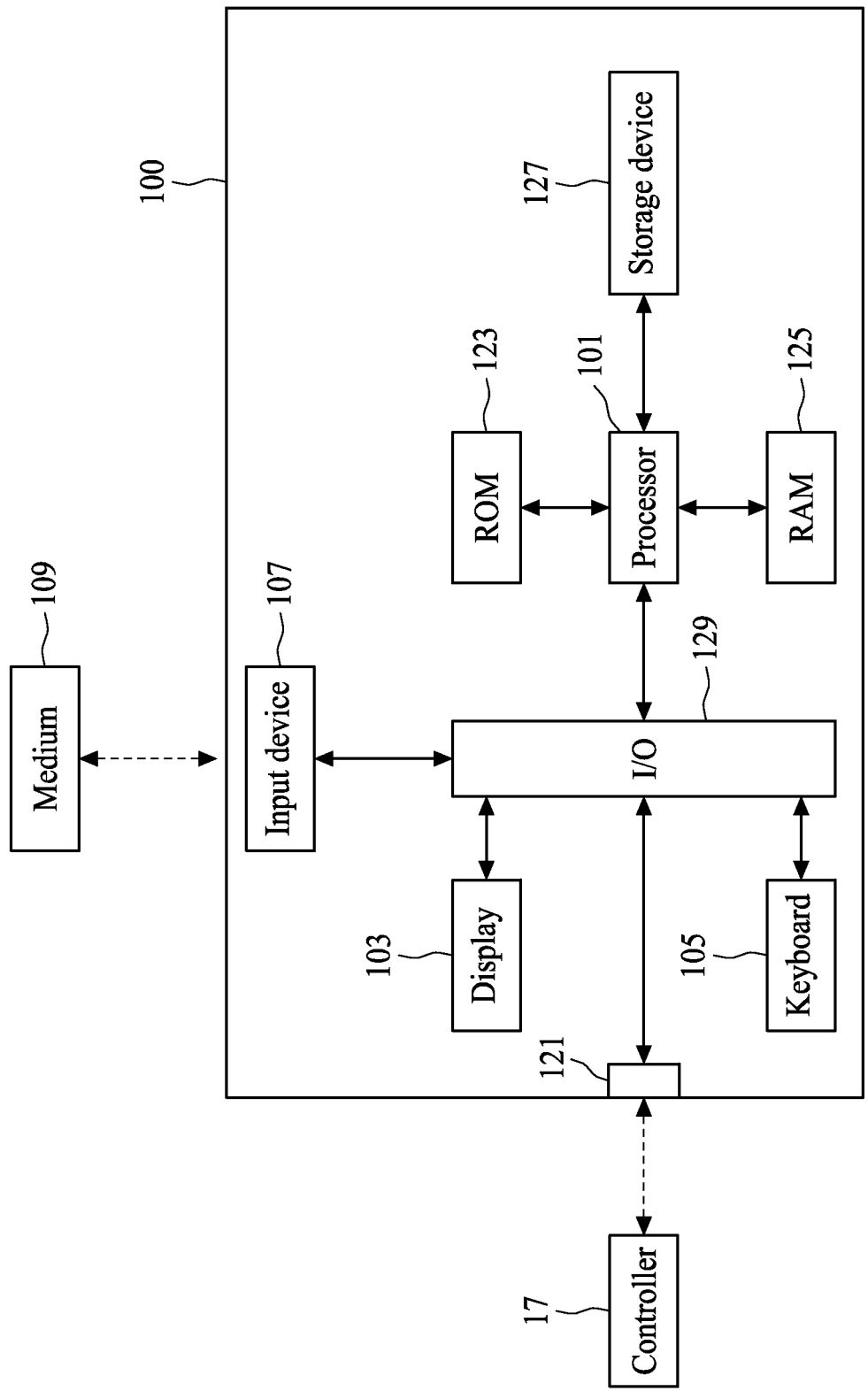
FIG. 3 is a functional block diagram of the computer in FIG. 1.

FIG. 3 is a functional block diagram of the computer 100 in FIG. 1. In some embodiments, the computer 100 comprises a computer processor 101 for performing a computer-implemented simulation method for use in injection molding. In some embodiments, the computer 100 includes a read-only memory (ROM) 123, a random access memory (RAM) 125, a storage device 127, an input/output (I/O) interface 129, and a communication port 121 associated with the controller 17 of the injection machine 10. The computer processor 101 operably communicates with the ROM 123, the RAM 125, the storage device 127, and the I/O interface 129.

In some embodiments, the computer 100 may further include a display 103, a keyboard 105, and an input device 107 such as a card reader or an optical disk drive. The input device 107 is configured to input computer instructions (software algorithms) stored in a non-transitory computer-readable medium 130, and the computer processor 101 is configured to execute operations for performing a computer-implemented injection molding simulation method according to the computer instructions. The computer processor 101 reads software algorithms from the input device 107 or the storage device 127, executes the calculation steps, and stores the calculated result in the RAM 125.

Figure 4:
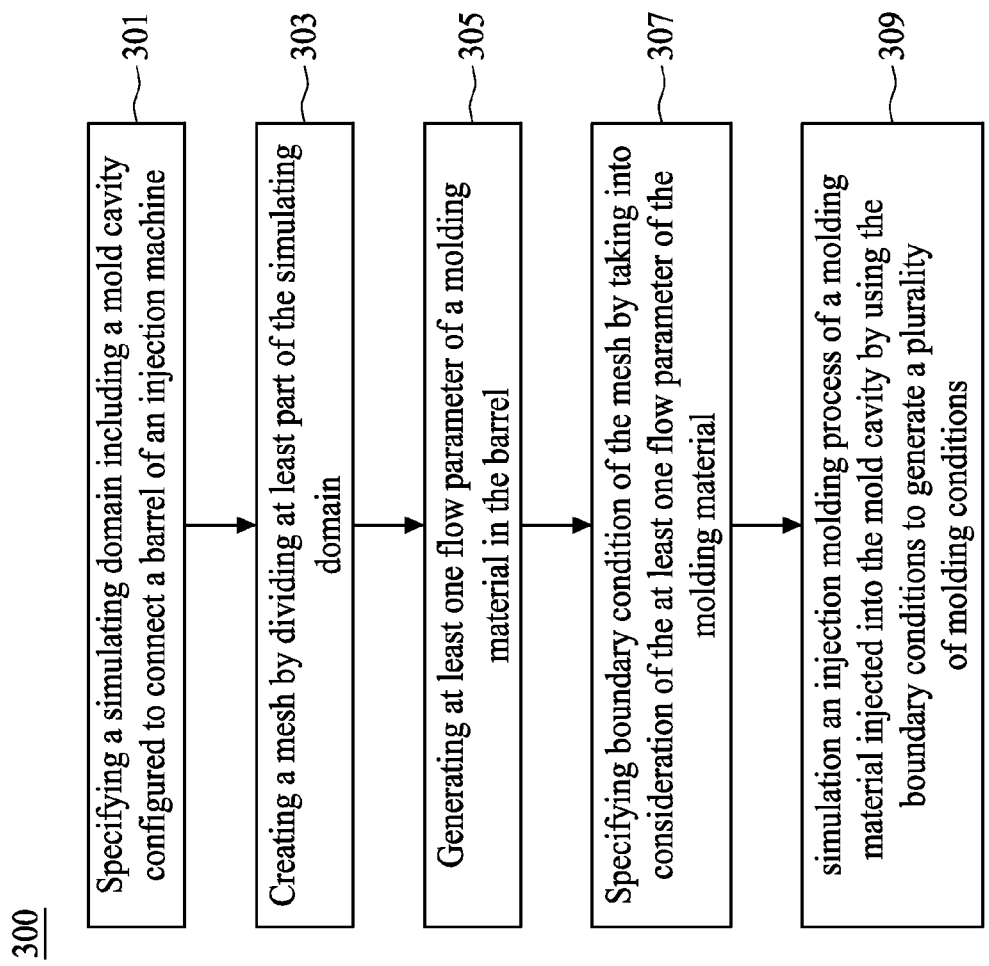
FIG. 4 shows a flow chart of an injection molding simulation method in accordance with various embodiments of the present disclosure.

FIG. 4 shows a flow chart of an injection molding simulation method 300, providing a high-level overview of the injection molding simulation method 300 in accordance with various embodiments of the present disclosure. In some embodiments, the main steps of the injection molding simulation method 300 comprise a step 301 of specifying a simulating domain having a mold cavity configured to connect a barrel of an injection machine, a step 303 of creating a mesh by dividing at least part of the simulating domain, a step 305 of generating at least one flow parameter of a molding material in the barrel, a step 307 of specifying boundary conditions of the mesh by taking into consideration the at least one flow parameter of the molding material, and a step 309 of simulating an injection molding process of the molding material that is injected into the mold cavity by using the boundary conditions to generate a plurality of molding conditions. In some embodiments, step 305 may be performed before step 303 or step 301.

The following describes an exemplary process flow of the injection molding simulation method 300 in accordance with various embodiments of the present disclosure.

Figure 5:
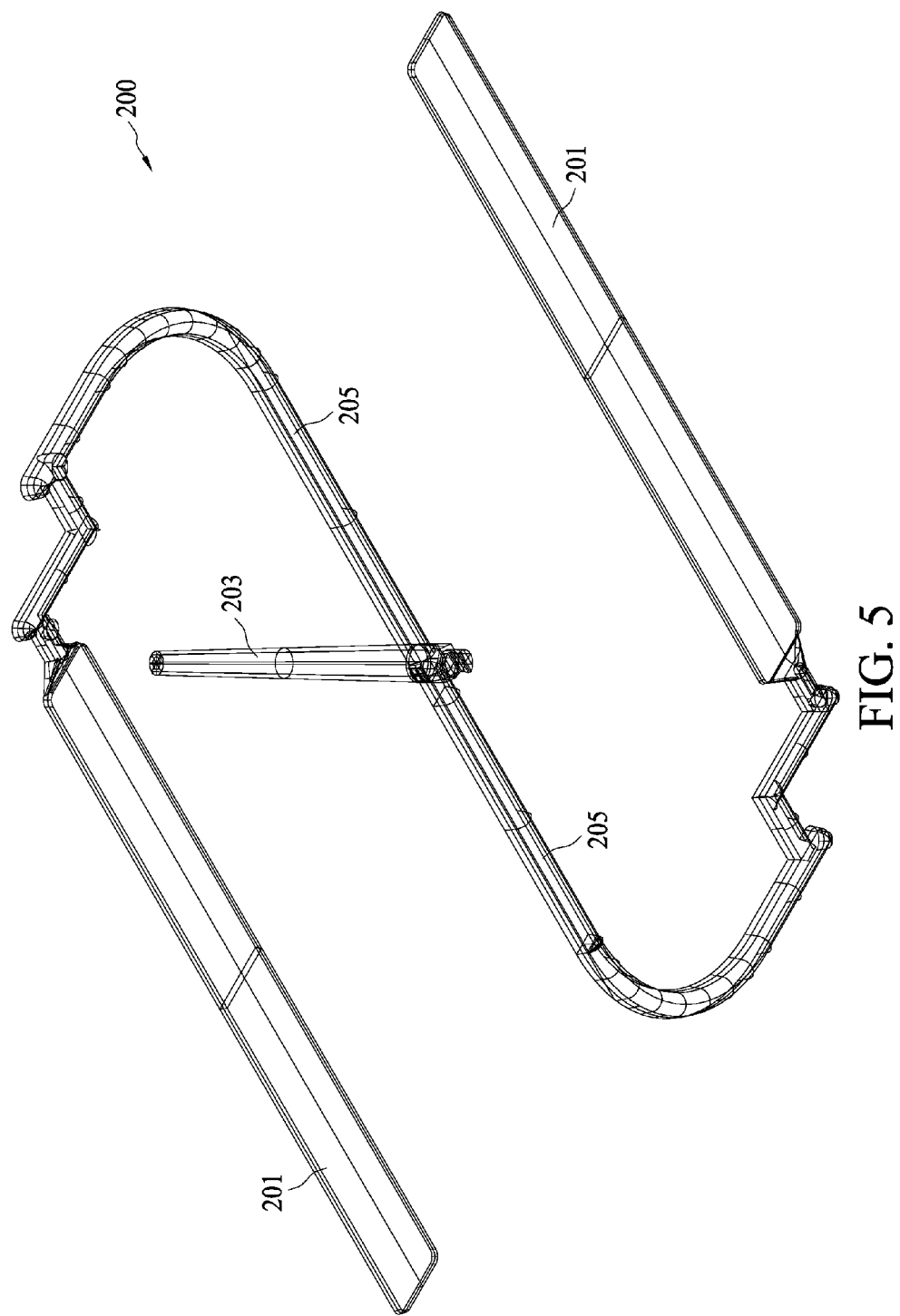
FIG. 5 is a schematic view of a simulating domain in accordance with various embodiments of the present disclosure.

FIG. 5 is a schematic view of a simulating domain 200 in accordance with various embodiments of the present disclosure. In some embodiments, the injection molding simulation method 300 can begin in step 301 where the simulating domain 200 having the mold cavity 25 is specified. In some embodiments, the simulating domain 200, which is obtained from a CAD (Computer Aided Design) model used in design and development of a product, includes two plates 201 corresponding to the mold cavity 25, a tapered part 203 corresponding to the sprue 21, and two curved parts 205 corresponding to the runners 23 of the mold 20.

Figure 6:
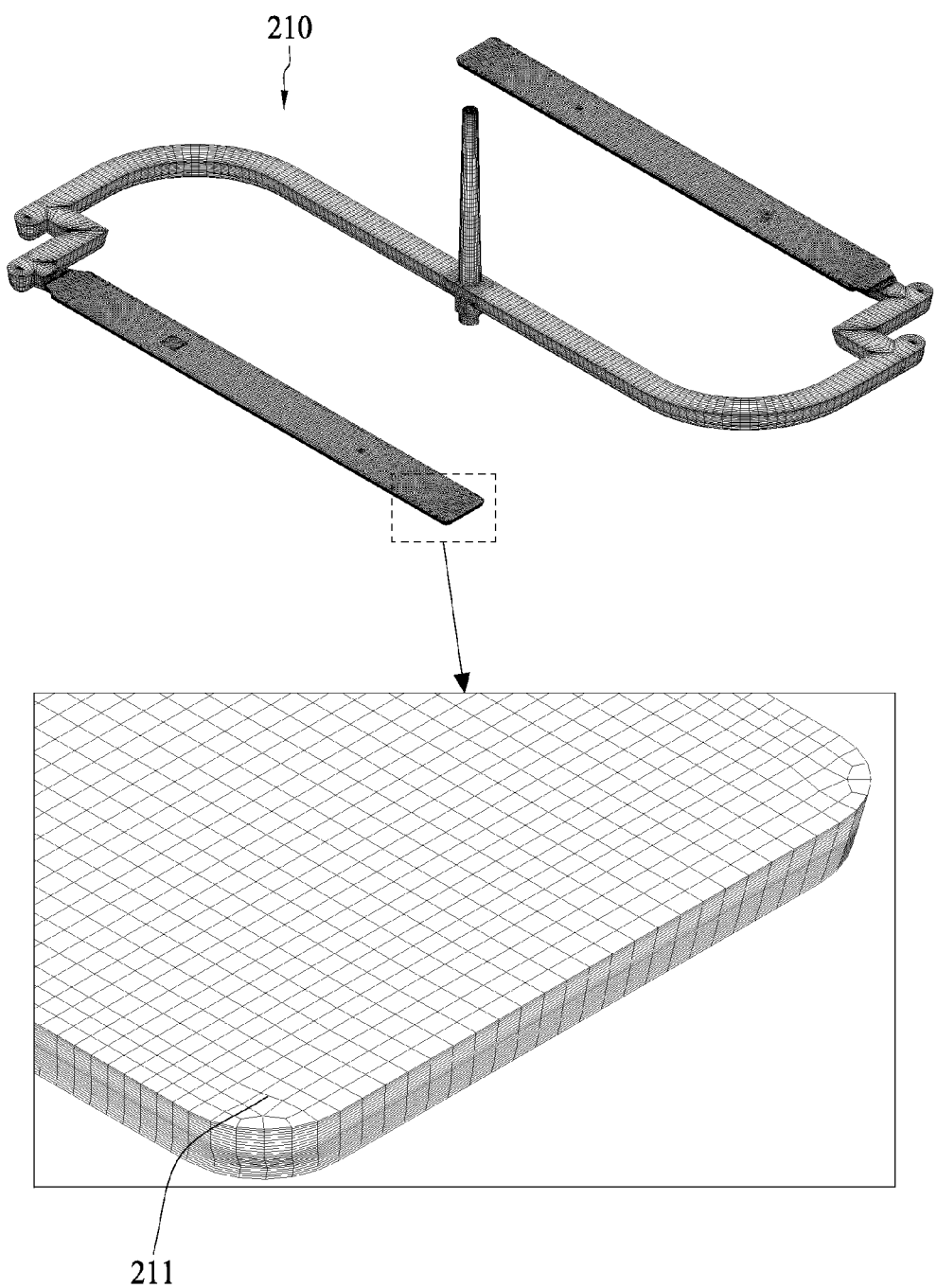
FIG. 6 is a schematic view of a mesh in accordance with various embodiments of the present disclosure.

FIG. 6 is a schematic view of a mesh 210 in accordance with various embodiments of the present disclosure. In step 303, the mesh 210 is created by dividing at least part of the simulating domain 200 before actually applying numerical analysis, such as an FEM (finite element method), an FDM (finite difference method) or an FVM (finite volume method), to the simulating domain 200. The creation of the mesh 210 is a technique of modeling an object or fluid region (i.e., the simulating domain 200 of the present embodiment) to be analyzed with a set of elements 211, such as rectangular mesh, hexahedral mesh or tetrahedral mesh, in order to perform the subsequent numerical analysis.

In step 305, at least one flow parameter of the molding material 16 in the barrel 11 is generated, for example, by taking into consideration a dynamic movement of the screw 15 in the barrel 11, a volume variation of the molding material 16 in the barrel 11, or the combination thereof. In some embodiments, the generating of the at least one flow parameter of the molding material 16 in the barrel 11 includes calculating a dynamic variation for a filling rate of the molding material 16 that is injected into the mold cavity 25, and the filling rate of the molding material 16 is used to calculate a flow velocity of the molding material 16 that is injected into the mold cavity 25 from the barrel 11. In some embodiments, the filling rate of the molding material 16 that is injected into the mold cavity 25 is used to calculate the flow velocity of the molding material 16 passing through the nozzle 14 between the barrel 11 and the mold cavity 25.

In some embodiments, the amount of the molding material 16 injected into the mold cavity 25 by the screw 15 in the barrel 11 can be acquired by using the following governing equations.

$$\frac{\partial \rho}{\partial t} + \nabla \cdot \rho u = 0, \tag{1}$$

$$\frac{\partial}{\partial t}(\rho u) + \nabla \cdot (\rho u u - \sigma) = \rho g \tag{2}$$

$$\sigma = -pI + \eta(\nabla u + \nabla u^T) \tag{3}$$

$$\rho C_P \left(\frac{\partial T}{\partial t} + u \cdot \nabla T\right) = \nabla \cdot (k \nabla T) + \eta \dot{\gamma}^2 \tag{4}$$

where u represents the velocity vector (flow velocity), T represents the temperature, t represents the time, p represents the pressure, σ represents the total stress tensor, ρ represents the density, η represents the viscosity, k represents the thermal conductivity, $C_P$ represents the specific heat, and $\dot{\gamma}$ represents the shear rate.

The velocity vector (u) in the government equations is influenced by the dynamic movement of the screw 15, which is configured to inject the molding material 16 from the barrel 11 into the mold cavity 25. In some embodiments, the dynamic movement of the screw 15 is a moving speed of the screw 15 in the barrel 11 with respect to an injection time or a position of the screw 15 in the barrel 11 with respect to the injection time. In some embodiments, the at least one dynamic movement of the screw 15 is transmitted to the computer 10, either from the controller 19 or from manufacturing of the injection molding machine 10. In some embodiments, the controller 17 instructs hydraulic or electric driving modules of the injection molding machine 10 to drive the screw 15 according a predetermined program, and the sensors of the injection machine 10 measure the dynamic movement of the screw 15, which is then transmitted to the computer 10 through the association therebetween.

Figure 7:
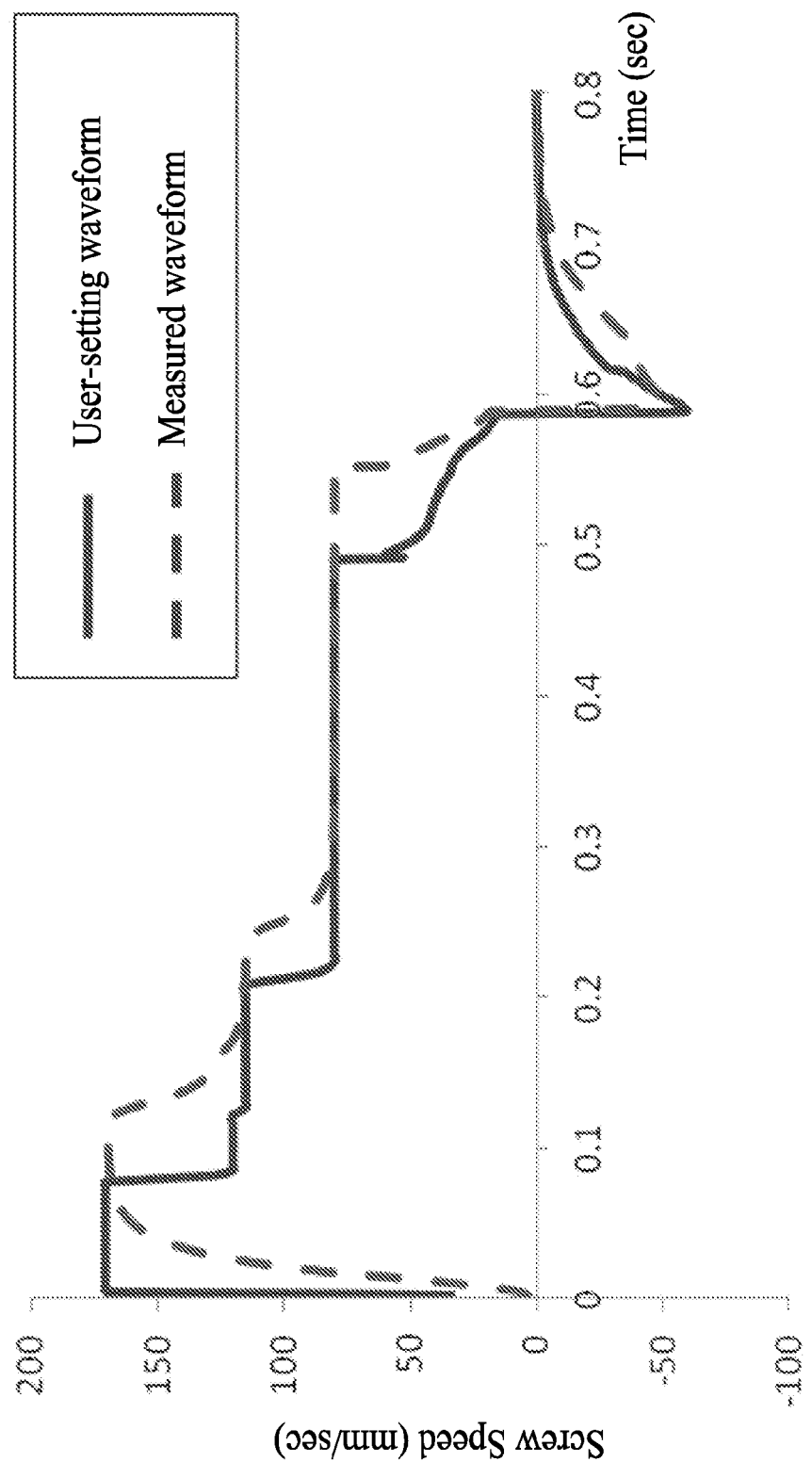
FIG. 7 is a chart showing a user-setting waveform and a measured waveform of the screw speed during the injection time.
Figure 8:
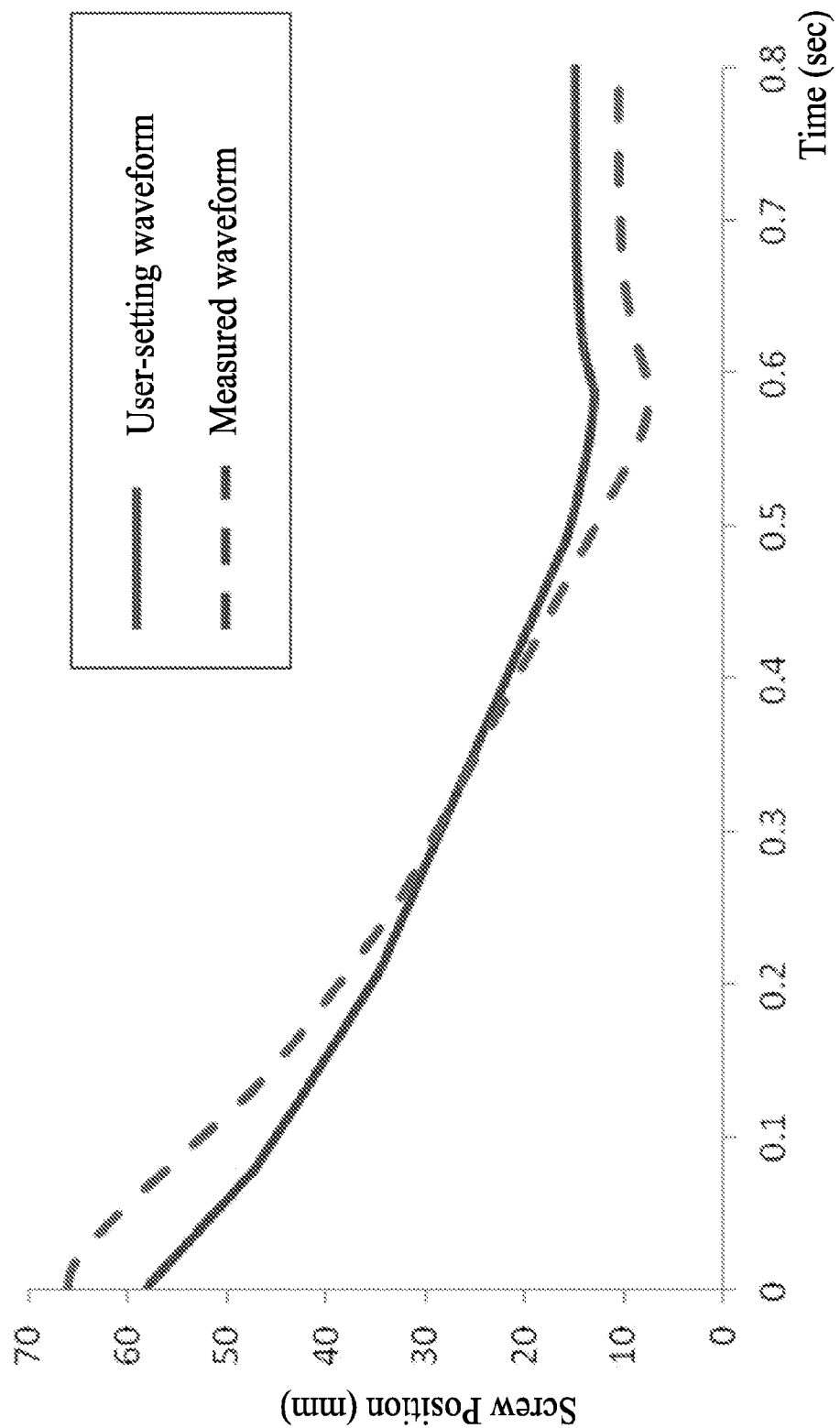
FIG. 8 is a chart showing a user-setting waveform and a measured waveform of the screw position during the injection time in accordance with various embodiments of the present disclosure.

FIG. 7 is a chart showing a user-setting waveform and a measured waveform of the screw speed during the injection time, and FIG. 8 is a chart showing a user-setting waveform and a measured waveform of the screw position during the injection time in accordance with various embodiments of the present disclosure. As clearly shown in FIG. 7, the user-setting waveform with an ideal step-wise shape does not fit the actually measured waveform of the screw speed during the injection time. Similarly, as clearly shown in FIG. 8, the user-setting waveform with an ideal step-wise shape does not fit the actually measured waveform of the screw position during the injection time.

The amount of the molding material 16 injected into the mold cavity 25 by the screw 15 in the barrel 11 depends on the movement of the screw 15 with respect to the injection time; however, the user-setting waveform of the screw speed and the user-setting waveform of the screw position during the injection time cannot actually represent the dynamic movement (moving behavior) of the screw 15, and therefore, are not suitable for use in the CAE software to simulate the molding phenomena of the molding material 16 injected into the mold cavity 25 by the screw 15 in the barrel 11. Instead of using the user-setting waveform of the screw speed or the user-setting waveform of the screw 15 position during the injection time, the present disclosure may acquire the measured waveform of the screw speed or the measured waveform of the screw position during the injection time for use in the CAE software to simulate the molding phenomena of the molding material 16 injected into the mold cavity 25 by the screw 15 in the barrel 11.

According to the government equations described in paragraph [0048], the amount of the molding material 16 injected into the mold cavity 25 by the screw 15 in the barrel 11 also depends on the volume variation of the molding material 16 with respect to the temperature and pressure. In some embodiments, the volume variation for calculating the at least one flow parameter of the molding material 16 is a compressibility of the molding material 16 with respect to the pressure, a shrinkage of the molding material 16 with respect to the temperature, or the combination thereof.

Figure 9:
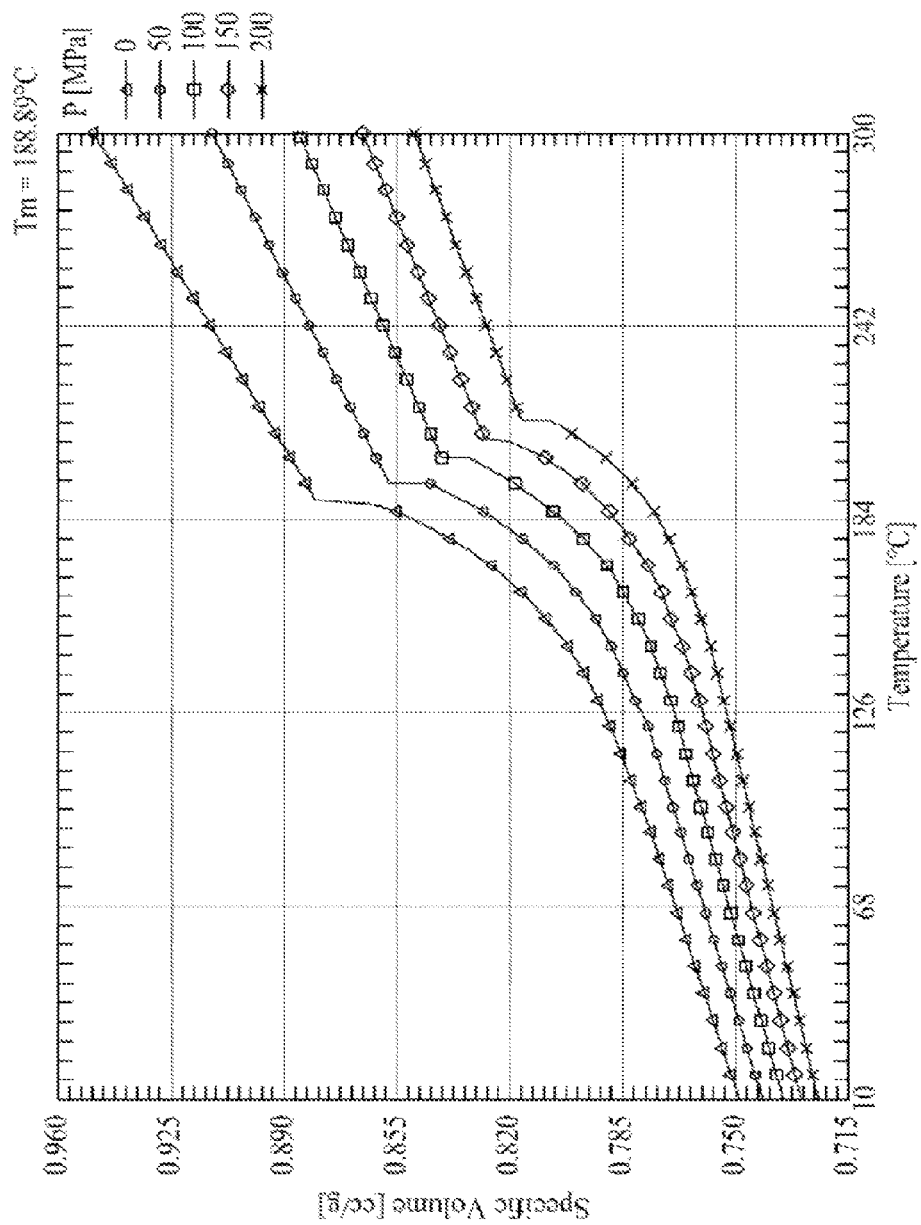
FIG. 9 is a chart showing the variation of the molding material on the specific volume (density) with respect to the pressure and the temperature in accordance with various embodiments of the present disclosure.

FIG. 9 is a chart showing the variation of the molding material 16 on the specific volume (density) with respect to the pressure and the temperature in accordance with various embodiments of the present disclosure. As shown in FIG. 9, the specific volume of the molding material 16 shrinks as the temperature decreases, and vice versa; in addition, the specific volume of the molding material 16 shrinks as the pressure increases, and vice versa. During the filling stage of the injection molding, the temperature and the pressure in the barrel 11 may not be kept constant, and the specific volume of the molding material 16 is not constant; therefore, the present disclosure may acquire the temperature and the pressure of the molding material 16 in the barrel 11 and then calculate the specific volume of the molding material 16 correspondingly.

Figure 10:
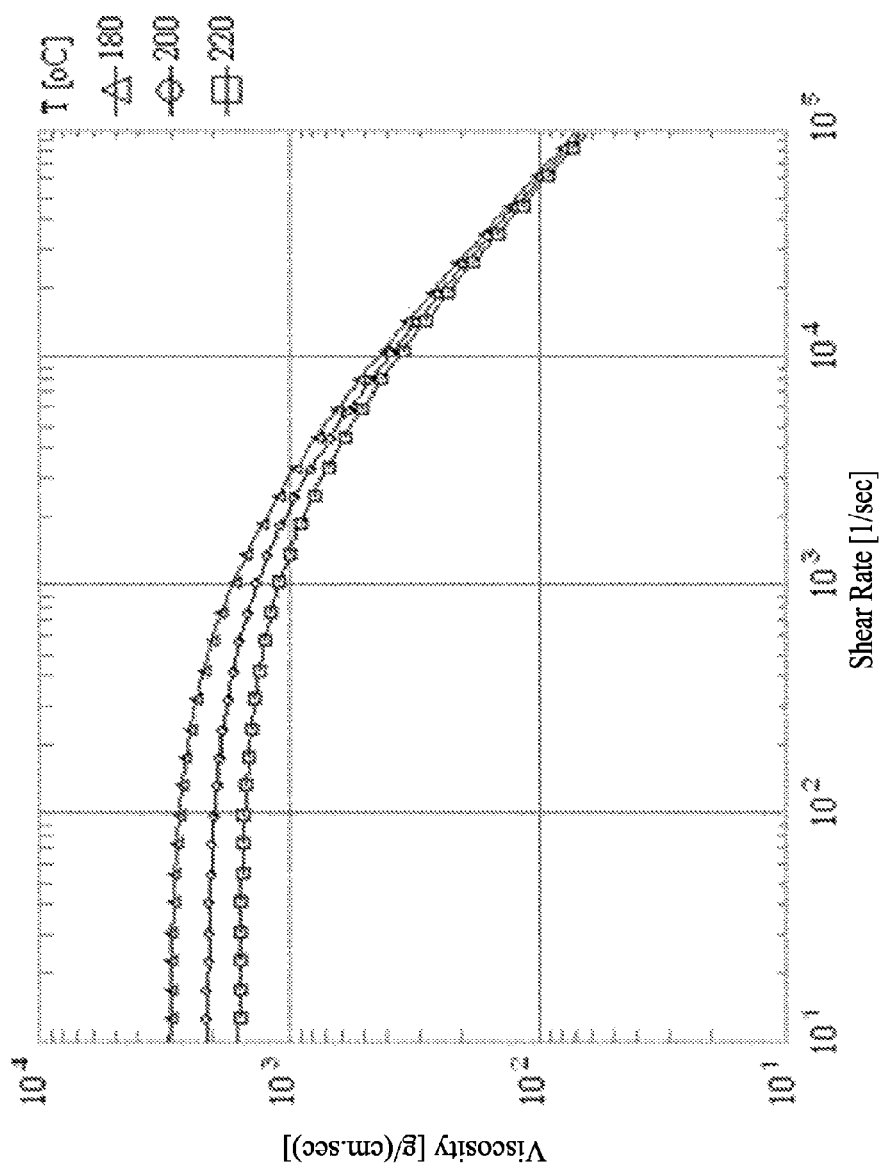
FIG. 10 is a chart showing the variation of the molding material on the viscosity ($\eta$) with respect to the shear rate and the temperature in accordance with various embodiments of the present disclosure.

According to the government equations described in paragraph [0048], the amount of the molding material 16 injected into the mold cavity 25 by the screw 15 in the barrel 11 also depends on the viscosity variation of the molding material 16 with respect to the shear rate and the temperature. FIG. 10 is a chart showing the variation of the molding material 16 on the viscosity (η) with respect to the shear rate and the temperature in accordance with various embodiments of the present disclosure. As shown in FIG. 10, the viscosity (η) of the molding material 16 decreases as the shear rate ($\dot{\gamma}$) increases, and vice versa; in addition, the viscosity (η) of the molding material 16 decreases as the temperature (T) increases, and vice versa.

The above governing equations described in paragraph [0048] are complicated, and numerical solving of these equations may require a lot of computation source and time. In some embodiments, assuming the viscosity within the time interval Δt is constant, and assuming the temperature variation within a time interval Δt is not large enough to generate significant influence and can be neglected; consequently, the above governing equations can be simplified into a mass conservation expression below.

$$\int \rho \cdot dV|_{t=t_1} = \int \rho \cdot dV|_{t=t_1+\Delta t} + \int_{t_1}^{t_1+\Delta t} \rho \cdot FR \cdot dt \tag{5}$$

wherein the former two integration calculate the mass of the molding material 16 at different injection times, $t_1$ and $t_1+\Delta t$. The third integration calculates molding material 16 that is injected into the mold cavity 25 from the barrel 11 during the time interval Δt, wherein FR represents the filling rate of the molding material 16 that is injected into the mold cavity 25 by the screw 15 in the barrel 11 (the filling rate of the molding material 16 passing through the nozzle 14 between the barrel 11 and the mold cavity 25).

The above mass conservation expression in the integral form can be converted into an algebraic expression below, which can be implemented numerically by using the computer.

$$\rho^t \cdot V^t = \rho^{t+dt} \cdot (V^{t+dt} + FR^{t+dt} \cdot dt) \tag{6}$$

wherein $\rho^t$ and $\rho^{t+dt}$ represent the densities (inverse of the specific volume) of the molding material 16 at different injection times, $V^t$ and $V^{t+dt}$ represent the volumes of the molding material 16 in the barrel 11 at different injection time, dt represents an increment of time, and $FR^{t+dt}$ represents the filling rate of the molding material 16 that is injected into the mold cavity 25 by the screw 15 in the barrel 11.

In some embodiments, the volumes (V) of the molding material 16 in the barrel 11 at different injection times are acquired from the positions of the screw 15 in the chart shown in FIG. 8 and the cross-sectional area of the screw 15; in addition, the density ($\rho$, inverse of the specific volume) of the molding material 16 at different injection times, which may correspond to different temperatures and pressures, is acquired from the chart shown in FIG. 9. Subsequently, the flow velocity of the molding material 16 that is injected into the mold cavity 25 from the barrel 11 can be calculated by dividing the filling rate of the molding material 16 with a cross-sectional area of a nozzle 14 between the barrel 11 and the mold cavity 25.

In step 307, the boundary conditions of the mesh 210 is specified for the injection molding simulation by taking into consideration the at least one flow parameter of the molding material 16 in the barrel 11. Subsequently, in step 309, a simulation is performed to simulate an injection molding process of the molding material 16 injected into the mold cavity 25 by the screw 15 by using the boundary conditions to generate a plurality of molding conditions.

The molding phenomena of the molding material in a mold cavity (the simulating domain) can be simulated by using the governing equations (1)-(4) described in paragraph [0048], which can be solved numerically by using the computer. See, e.g., Rong-yeu Chang, and Wen-hsien Yang, Numerical simulation of mold filling in injection molding using a three-dimensional finite volume approach, International Journal for Numerical Methods in Fluids Volume 37, Issue 2, pages 125-148, 30 Sep. 2001, and the entirety of which is herein incorporated by reference.

In some embodiments, the present disclosure sets the boundary conditions (e.g., the flow velocity) of the mesh 210 by taking into consideration the at least one flow parameter of the molding material and performs the numerical analysis, such as an FEM, FDM or FVM, to the simulating molding phenomena of the molding material 16 in the simulating domain 200, so as to generate a plurality of molding conditions for setting the injection machine 10. The injection molding is then actually conducted in the injection molding machine 10.

Figure 11:
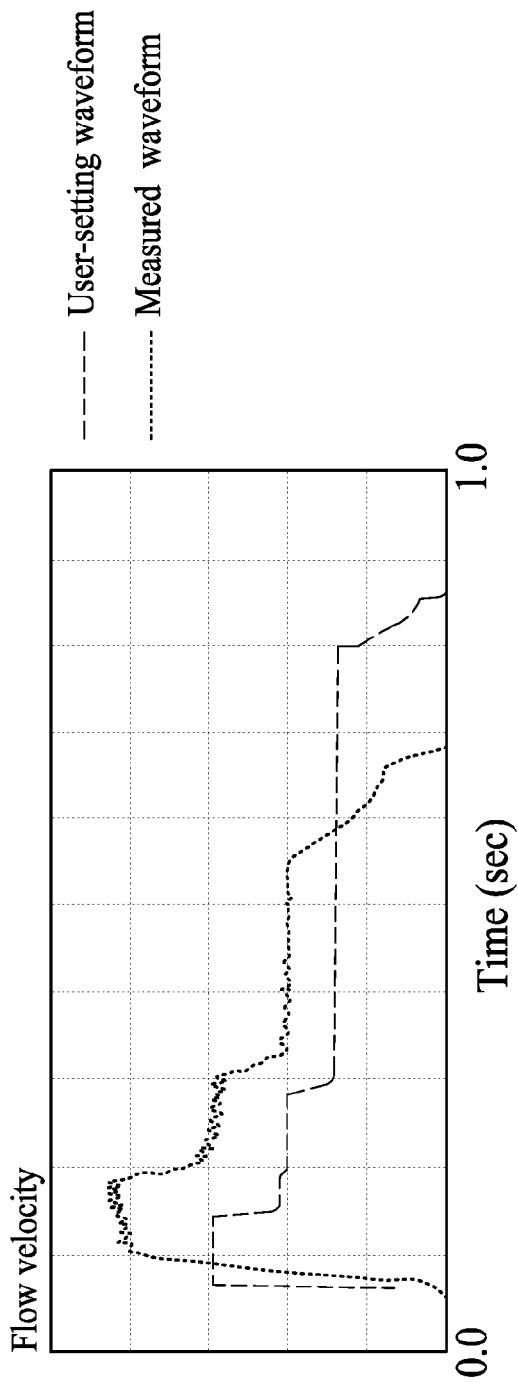
FIG. 11 shows a user-setting waveform and a measured waveform of the flow velocity of the molding material with respect to the injection time.

FIG. 11 shows a user-setting waveform and a measured waveform of the flow velocity of the molding material 16 with respect to the injection time. As clearly shown in FIG. 11, the user-setting waveform with a step-wise shape does not fit the measured waveform of the flow velocity of the molding material 16 with respect to the injection time. Therefore, the user-setting waveform is not suitable for use in the CAE software in order to simulate the molding phenomena of the molding material 16 injected into the mold cavity 25 from the tube (barrel) 11.

Figure 12:
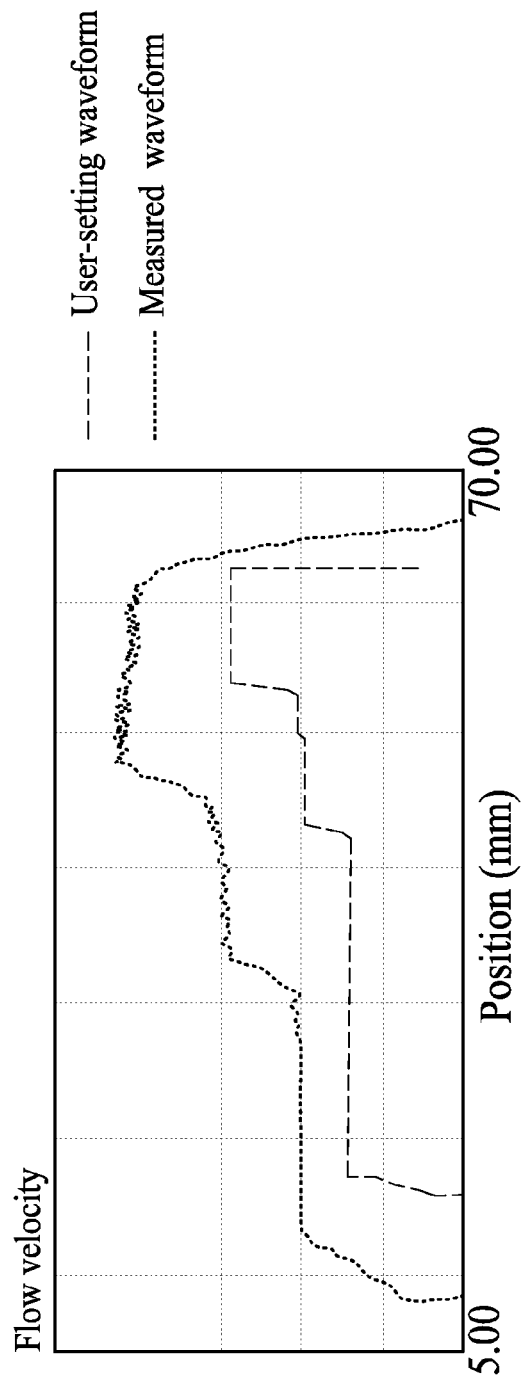
FIG. 12 shows a user-setting waveform and a measured waveform of the flow velocity of the molding material with respect to the position of the screw.

FIG. 12 shows a user-setting waveform and a measured waveform of the flow velocity of the molding material 16 with respect to the position of the screw 15. As clearly shown in FIG. 12, the user-setting waveform with a step-wise shape does not fit the measured waveform of the flow velocity of the molding material 16 with respect to the position of the screw 15. Therefore, the user-setting waveform is not suitable for use in the CAE software in order to simulate the molding phenomena of the molding material 16 injected into the mold cavity 25 from the tube (barrel) 11.

Figure 13:
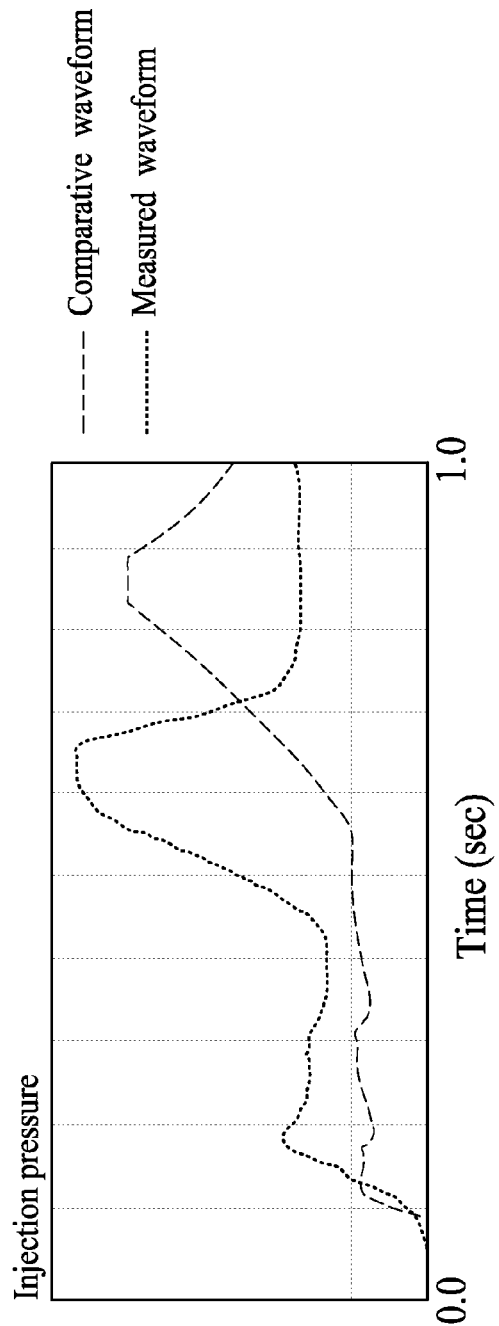
FIG. 13 shows a comparative waveform and a measured waveform of the injection pressure of the molding material with respect to the injection time.

FIG. 13 shows a comparative waveform and a measured waveform of the injection pressure of the molding material 16 with respect to the injection time. The comparative waveform is generated by the governing equations (1)-(4) and either the user-setting waveform in FIG. 11 or FIG. 12. As clearly shown in FIG. 13, the comparative waveform does not fit the measured waveform of the injection pressure of the molding material 16 with respect to the injection time. Therefore, the comparative waveform is not suitable for use in the CAE software in order to simulate the molding phenomena of the molding material 16 injected into the mold cavity 25 from the tube (barrel) 11.

Figure 14:
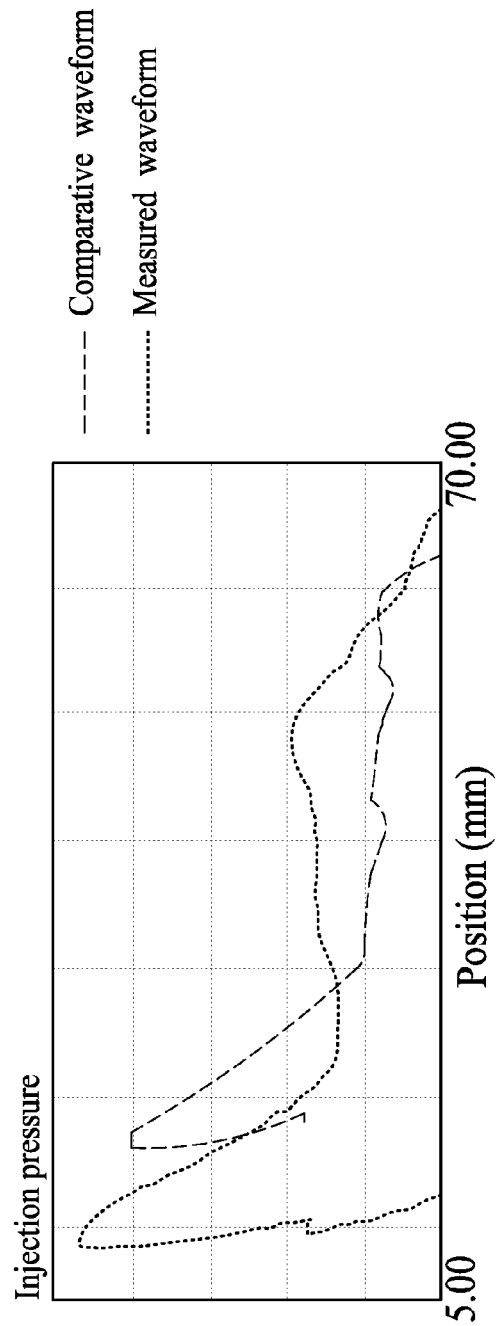
FIG. 14 shows a comparative waveform and a measured waveform of the injection pressure of the molding material with respect to the position of the screw.

FIG. 14 shows a comparative waveform and a measured waveform of the injection pressure of the molding material 16 with respect to the position of the screw 15. The comparative waveform is generated by the governing equations (1)-(4) and either the user-setting waveform in FIG. 11 or FIG. 12. As clearly shown in FIG. 14, the comparative waveform does not fit the measured waveform of the injection pressure of the molding material 16 with respect to the position of the screw 15. Therefore, the comparative waveform is not suitable for use in the CAE software in order to simulate the molding phenomena of the molding material 16 injected into the mold cavity 25 from the tube (barrel) 11.

Figure 15:
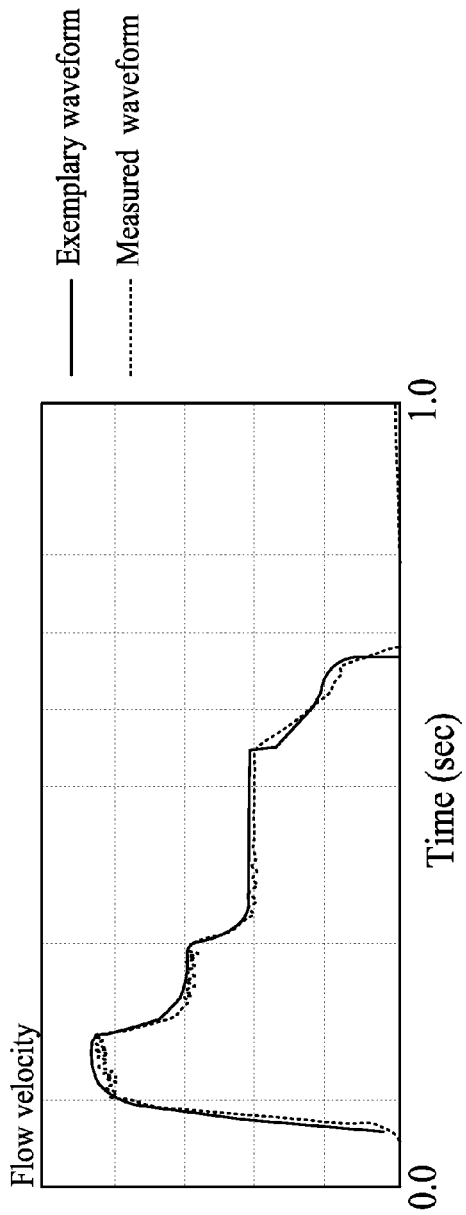
FIG. 15 shows a measured waveform and an exemplary waveform of the flow velocity of the molding material with respect to the injection time in accordance with various embodiments of the present disclosure.

FIG. 15 shows a measured waveform and an exemplary waveform of the flow velocity of the molding material 16 with respect to the injection time in accordance with various embodiments of the present disclosure. In some embodiments, the exemplary waveform of the flow velocity of the molding material 16 is generated by taking into consideration the dynamic movement of the pusher (screw) 15 in the tube (barrel) 11, a volume variation of the molding material 16 in the tube 11, or the combination thereof, e.g., the mass conservation expression (5) described in paragraph [0056]. As clearly shown in FIG. 15, the exemplary waveform substantially fits the measured waveform of the flow velocity of the molding material 16 with respect to the injection time; therefore, the exemplary waveform is more suitable for use in the CAE software in order to simulate the molding phenomena of the molding material 16 injected into the mold cavity 25 from the tube (barrel) 11.

Figure 16:
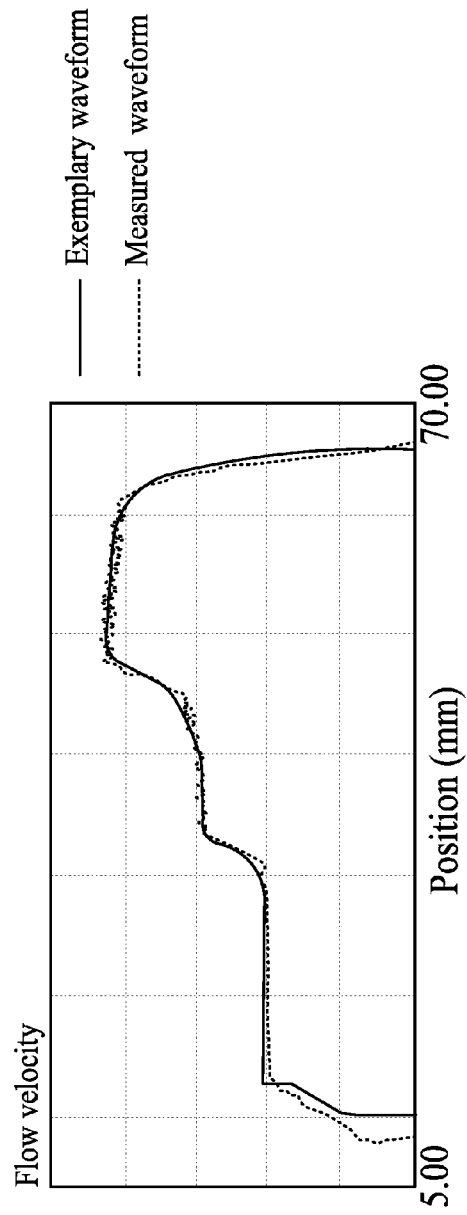
FIG. 16 shows a measured waveform and an exemplary waveform of the flow velocity of the molding material with respect to the position of the screw in accordance with various embodiments of the present disclosure.

FIG. 16 shows a measured waveform and an exemplary waveform of the flow velocity of the molding material 16 with respect to the position of the screw 15 in accordance with various embodiments of the present disclosure. In some embodiments, the exemplary waveform of the flow velocity of the molding material 16 is generated by taking into consideration the dynamic movement of the pusher (screw) 15 in the tube (barrel) 11, a volume variation of the molding material 16 in the tube 11, or the combination thereof, e.g., the mass conservation expression (5) described in paragraph [0056]. As clearly shown in FIG. 16, the exemplary waveform substantially fits the measured waveform of the flow velocity of the molding material 16 with respect to the position of the screw 15; therefore, the exemplary waveform is more suitable for use in the CAE software in order to simulate the molding phenomena of the molding material 16 injected into the mold cavity 25 from the tube (barrel) 11.

Figure 17:
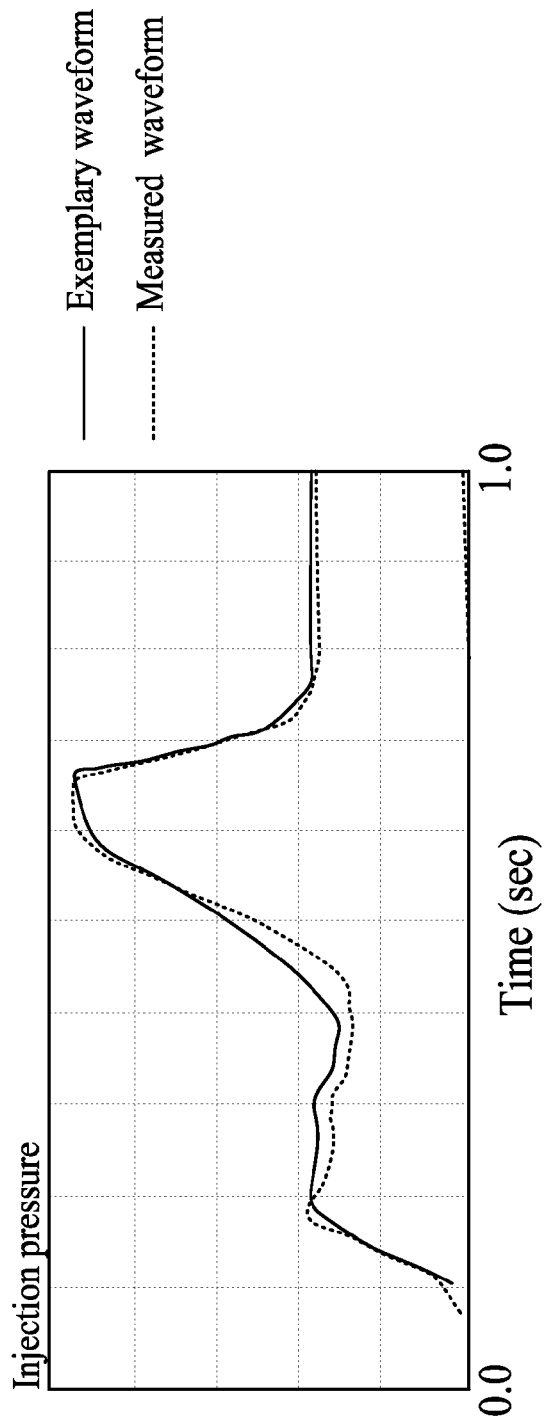
FIG. 17 shows a measured waveform and an exemplary waveform of the injection pressure of the molding material with respect to the injection time in accordance with various embodiments of the present disclosure.

FIG. 17 shows a measured waveform and an exemplary waveform of the injection pressure of the molding material 16 with respect to the injection time in accordance with various embodiments of the present disclosure. In some embodiments, the exemplary waveform of the injection pressure of the molding material 16 is generated by the governing equations (2)-(5) and either the exemplary waveform in FIG. 15 or FIG. 16. As clearly shown in FIG. 17, the exemplary waveform substantially fits the measured waveform of the injection pressure of the molding material 16 with respect to the injection time; therefore, the exemplary waveform is more suitable for use in the CAE software in order to simulate the molding phenomena of the molding material 16 injected into the mold cavity 25 from the tube (barrel) 11.

Figure 18:
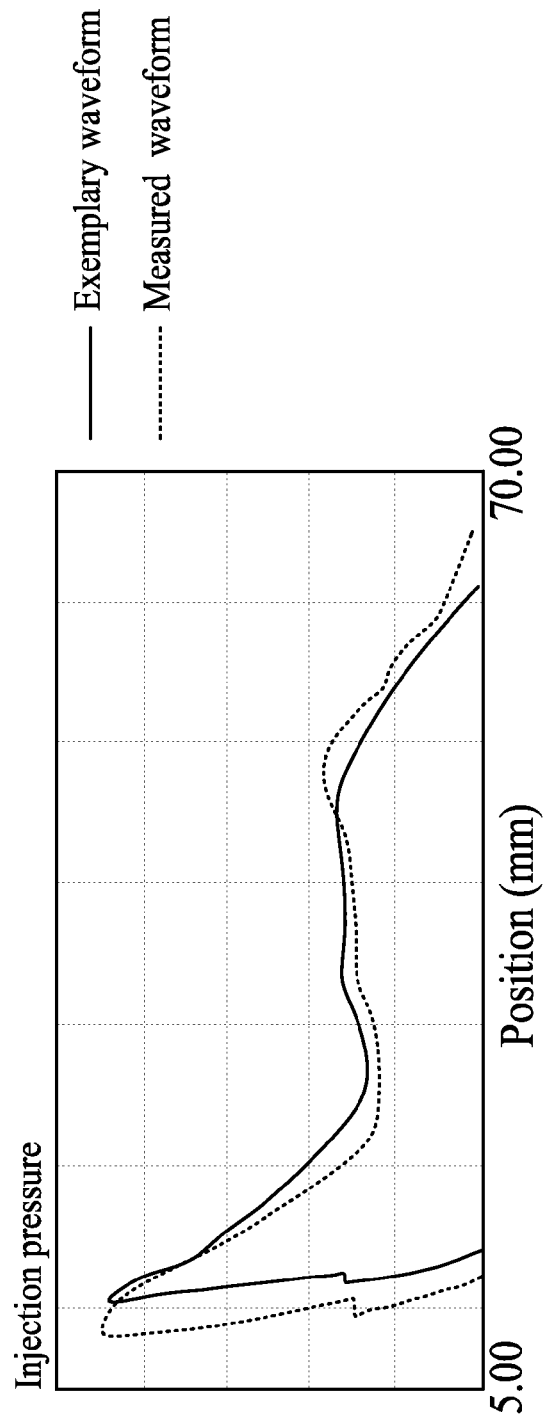
FIG. 18 shows a measured waveform and an exemplary waveform of the injection pressure of the molding material with respect to the position of the screw in accordance with various embodiments of the present disclosure.

FIG. 18 shows a measured waveform and an exemplary waveform of the injection pressure of the molding material 16 with respect to the position of the screw 15 in accordance with various embodiments of the present disclosure. As clearly shown in FIG. 18, the exemplary waveform substantially fits the measured waveform of the injection pressure of the molding material 16 with respect to the position of the screw 15; therefore, the exemplary waveform is more suitable for use in the CAE software in order to simulate the molding phenomena of the molding material 16 injected into the mold cavity 25 from the tube (barrel) 11.

Figure 19:
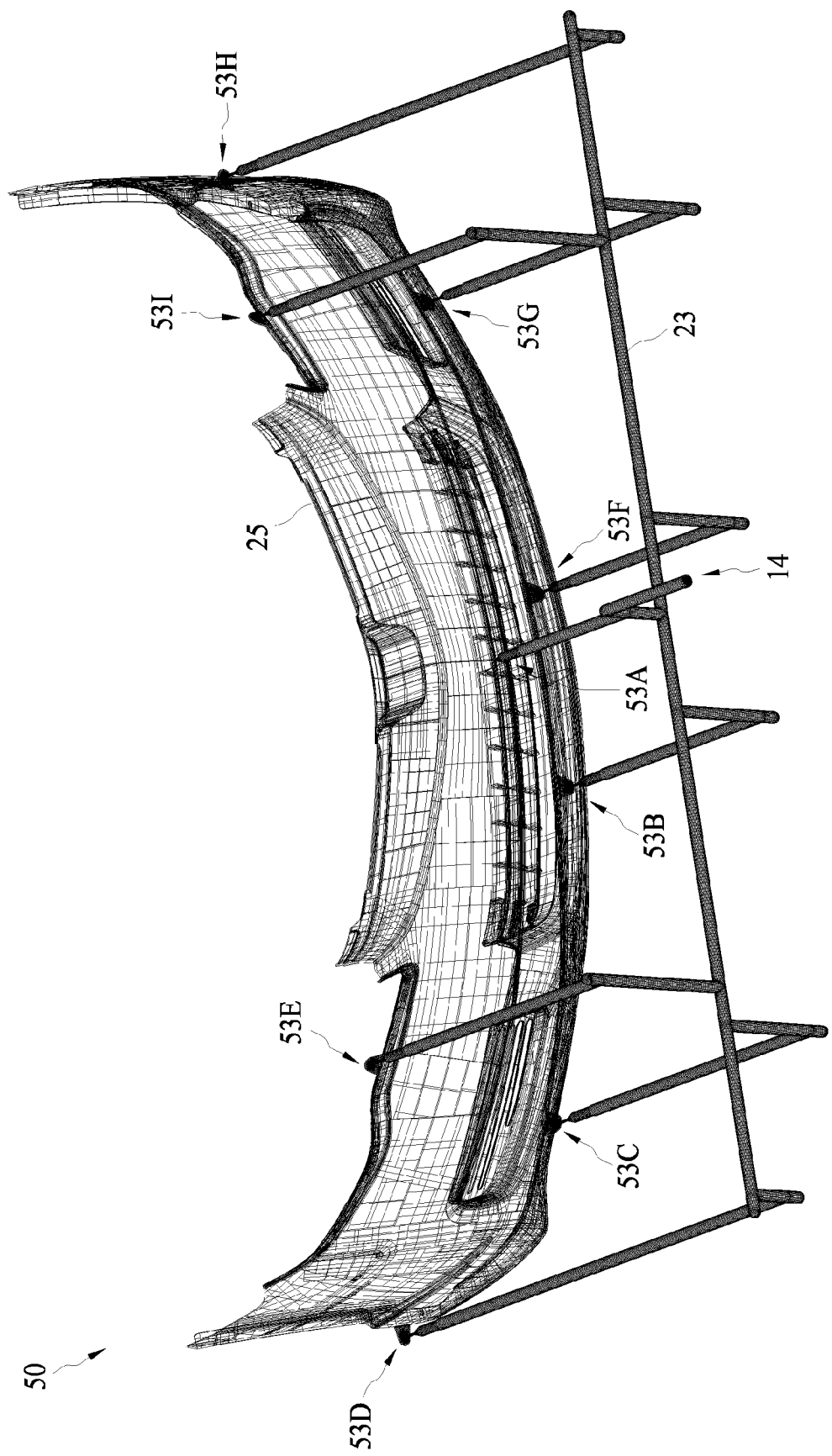
FIG. 19 is a schematic view of a simulating domain in accordance with various embodiments of the present disclosure.

FIG. 19 is a schematic view of a simulating domain 50 in accordance with various embodiments of the present disclosure. In some embodiments, the simulating domain 50 has a mold cavity for molding a bumper for vehicles and a plurality of runners 23 connected to the mold cavity via a plurality of valve gates 53A-53I respectively, and the molding material 16 is injected into the mold cavity via the runners 23 from a nozzle 14 connected to the barrel 11 of the injection machine 10.

Figure 20:
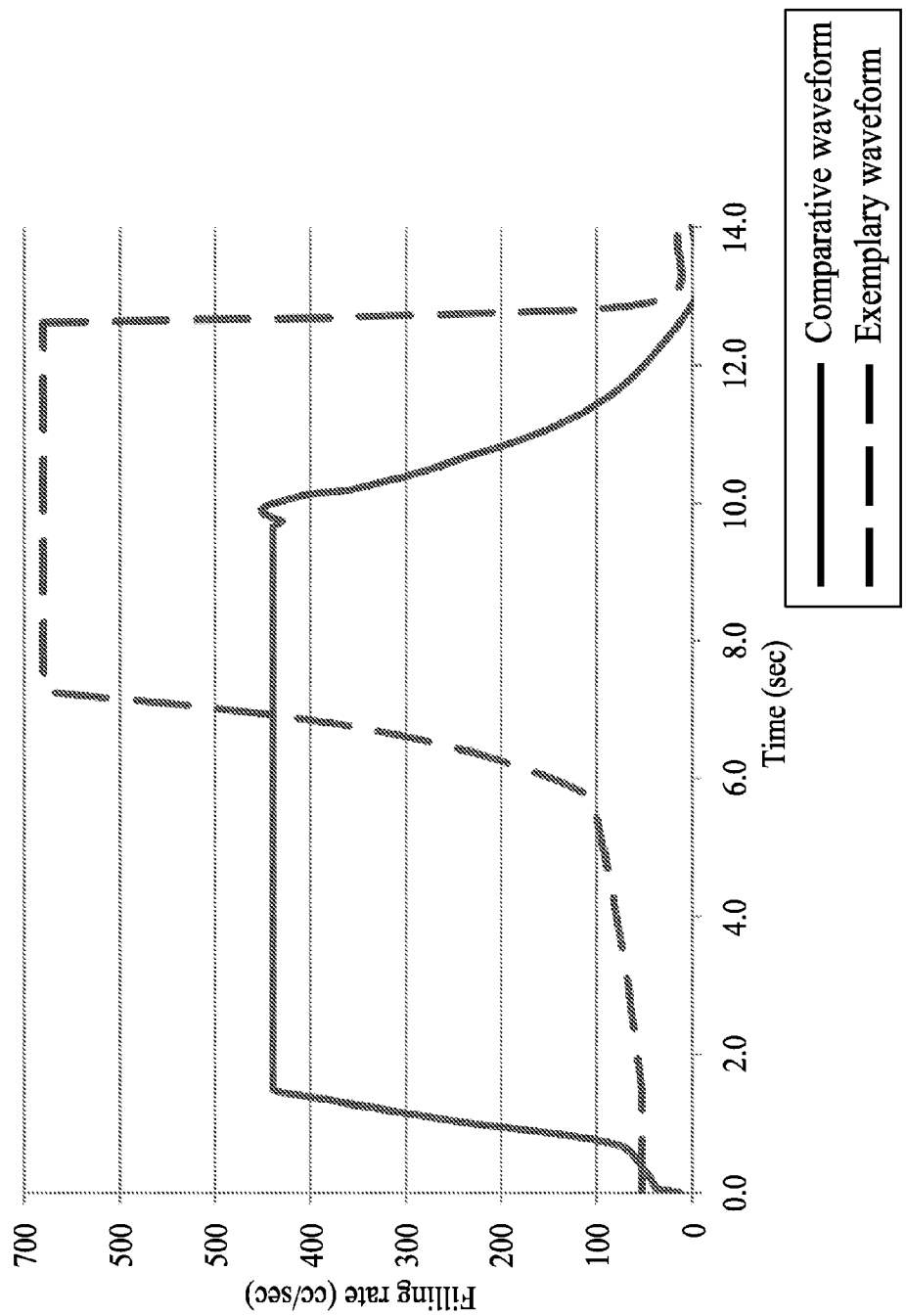
FIG. 20 is a chart showing a comparative waveform for the filling rate of the molding material passing through the nozzle using a user-setting step-wise waveform to describe the movement of the screw and an exemplary waveform for the filling rate of the molding material passing through the nozzle during the injection time both in the filling stage and packing stage in accordance with various embodiments of the present disclosure.

FIG. 20 is a chart showing a comparative waveform for the filling rate of the molding material 16 passing through the nozzle 14 using a user-setting step-wise waveform to describe the movement of the screw 15 and an exemplary waveform for the filling rate of the molding material 16 passing through the nozzle 14 during the injection time both in the filling stage and packing stage in accordance with various embodiments of the present disclosure. As clearly shown in FIG. 20, the comparative waveform does not fit the exemplary waveform of the filling rate of the molding material 16 passing through the nozzle 14 during the injection time because the exemplary waveform of the present disclosure is generated by taking into consideration the dynamic movement of the screw 15 in the barrel 11, the volume variation of the molding material 16 in the barrel 11, or the combination thereof.

Figure 21:
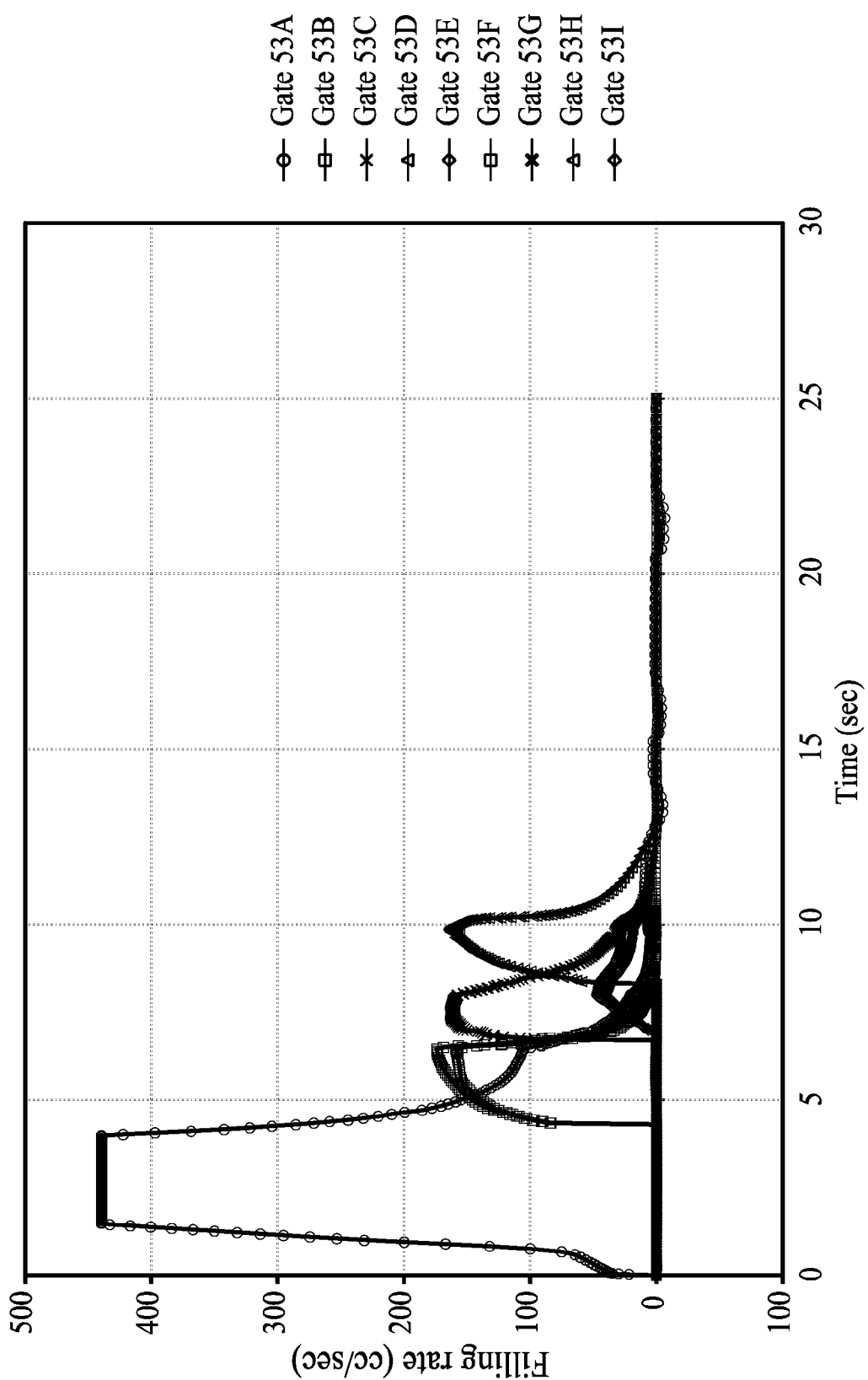
FIG. 21 is a chart showing the comparative waveforms for the filling rates of the molding material flowing through the valve gates using a user-setting step-wise waveform to describe the movement of the screw during the injection time.
Figure 22:
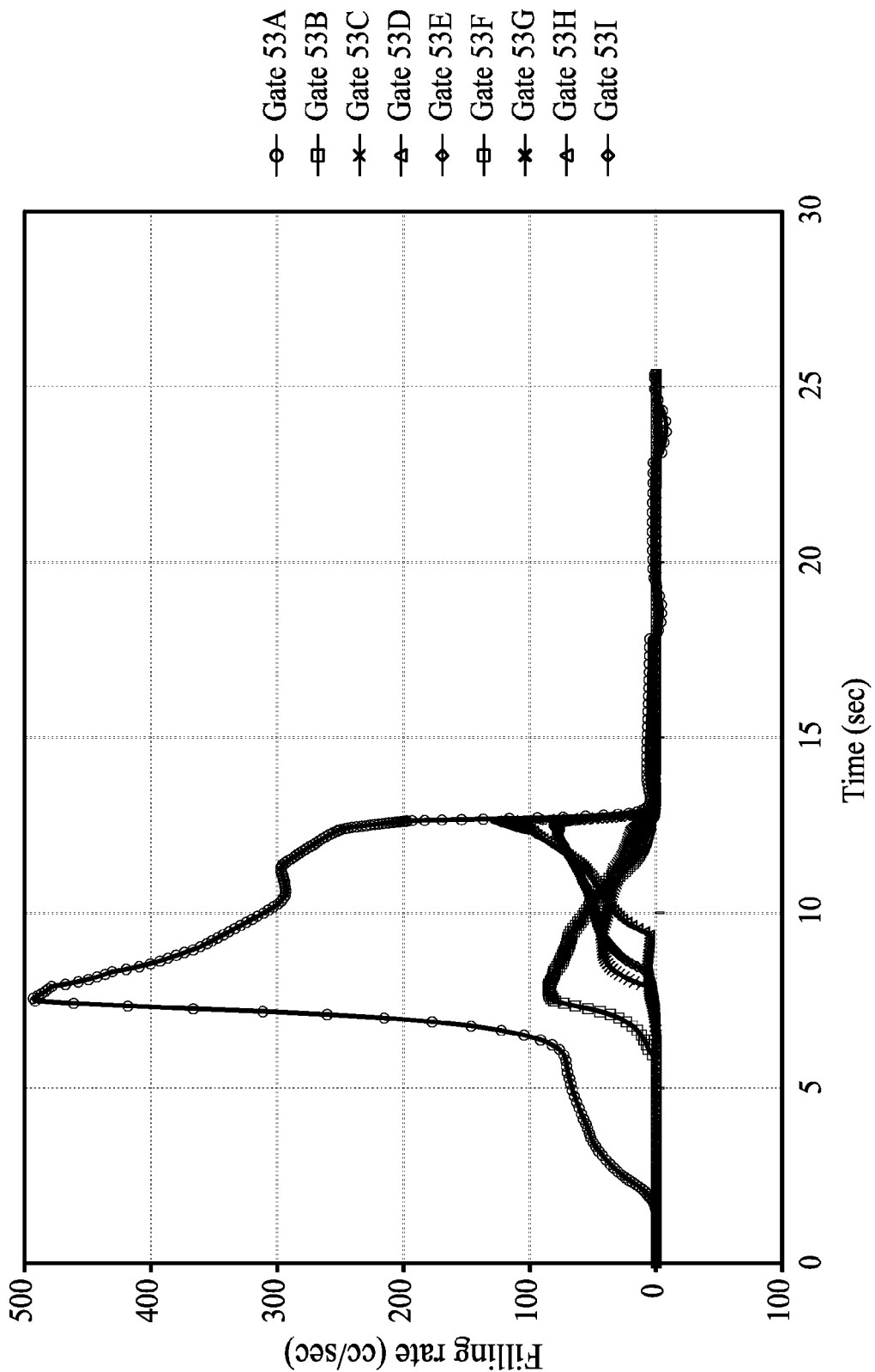
FIG. 22 is a chart showing the exemplary waveforms for the filling rates of the molding material flowing through the valve gates in the mold during the injection time in accordance with various embodiments of the present disclosure.

FIG. 21 is a chart showing the comparative waveforms for the filling rates of the molding material 16 flowing through the valve gates 53A-53I using a user-setting step-wise waveform to describe the movement of the screw 15 during the injection time, and FIG. 22 is a chart showing the exemplary waveforms for the filling rates of the molding material 16 flowing through the valve gates 53A-53I in the mold 20 during the injection time in accordance with various embodiments of the present disclosure. As clearly shown in FIG. 21 and FIG. 22, the comparative waveforms do not fit the exemplary waveforms of the filling rate of the molding material 16 passing through the valve gates 53A-53I in the mold 20 during the injection time because the exemplary waveforms of the present disclosure are generated by taking into consideration the dynamic movement of the screw 15 in the barrel 11, the volume variation of the molding material 16 in the barrel 11, or the combination thereof.

Figures 23, 24:
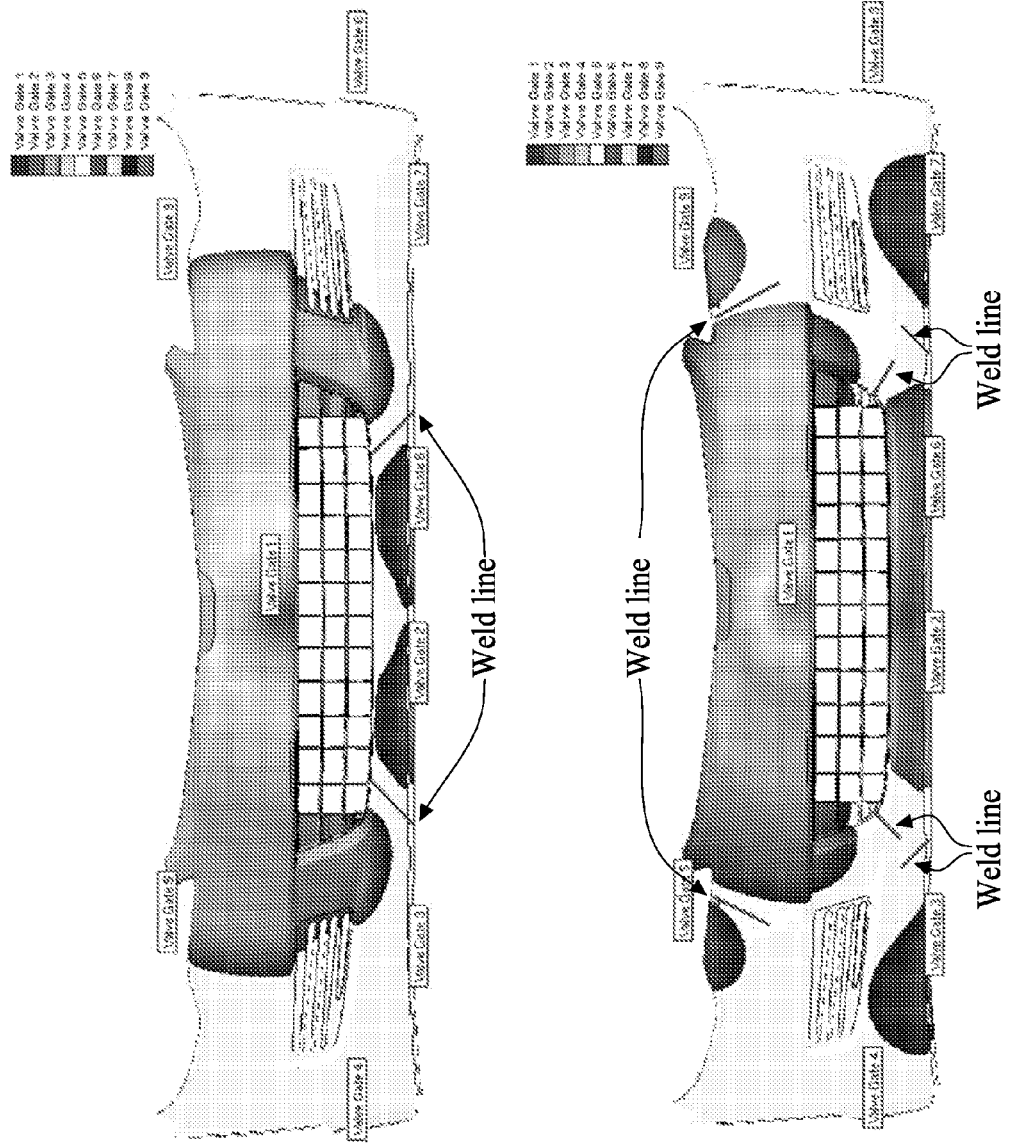
FIG. 23 is a comparative diagram showing the filling weld lines after the mold cavity is half filled by the molding material flowing through the valve gates in the mold using the comparative waveforms of the filling rates shown in FIG. 21.
FIG. 24 is an exemplary diagram showing the filling weld lines after the mold cavity is half filled by the molding material flowing through the valve gates in the mold using the exemplary waveforms of the filling rates shown in FIG. 22 in accordance with various embodiments of the present disclosure.

FIG. 23 is a comparative diagram showing the filling weld lines after the mold cavity 25 is half filled by the molding material 16 flowing through the valve gates 53A-53I in the mold 20 using the comparative waveforms of the filling rates shown in FIG. 21, and FIG. 24 is an exemplary diagram showing the filling weld lines after the mold cavity 25 is half filled by the molding material 16 flowing through the valve gates 53A-53I in the mold 20 using the exemplary waveforms of the filling rates shown in FIG. 22 in accordance with various embodiments of the present disclosure.

Figure 25:
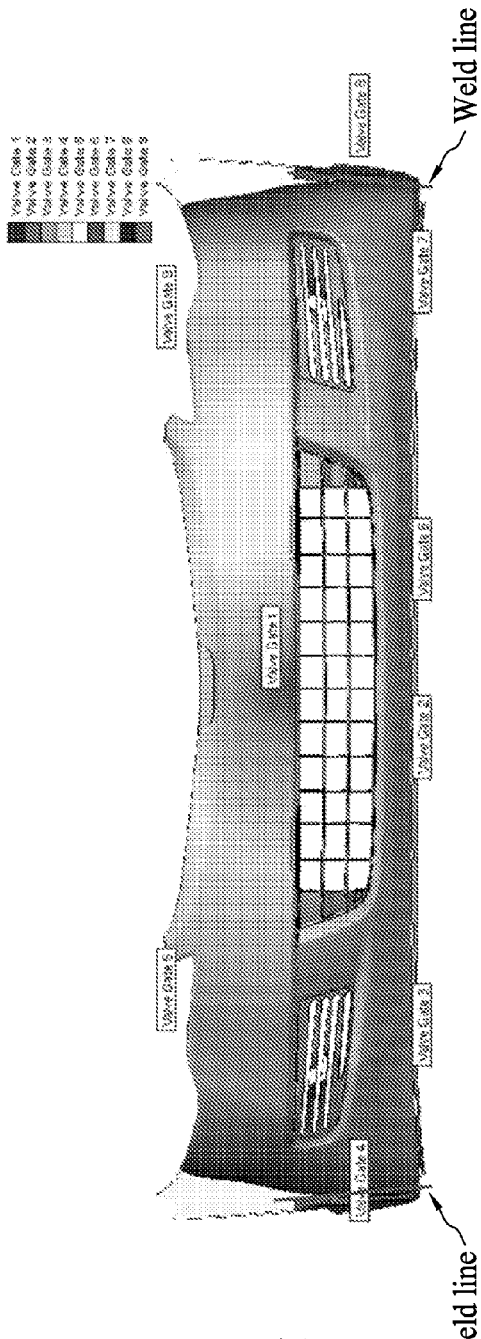
FIG. 25 is a comparative diagram showing the filling weld lines after the mold cavity is 90% filled by the molding material flowing through the valve gates in the mold using the comparative waveforms of the filling rates shown in FIG. 21.
Figure 26:
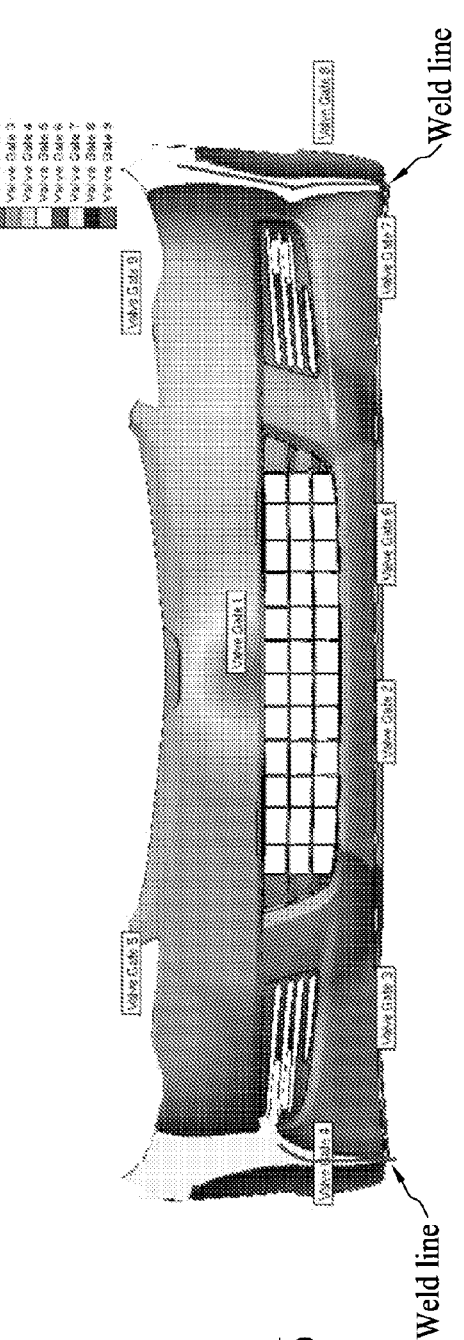
FIG. 26 is an exemplary diagram showing the filling weld lines after the mold cavity is 90% filled by the molding material flowing through the valve gates in the mold using the exemplary waveforms of the filling rates shown in FIG. 22 in accordance with various embodiments of the present disclosure.

FIG. 25 is a comparative diagram showing the filling weld lines after the mold cavity 25 is 90% filled by the molding material 16 flowing through the valve gates 53A-53I in the mold 20 using the comparative waveforms of the filling rates shown in FIG. 21, and FIG. 26 is an exemplary diagram showing the filling weld lines after the mold cavity 25 is 90% filled by the molding material 16 flowing through the valve gates 53A-53I in the mold 20 using the exemplary waveforms of the filling rates shown in FIG. 22 in accordance with various embodiments of the present disclosure.

As clearly shown in FIG. 23 and FIG. 24 (or FIG. 25 and FIG. 25), the positions of the filling weld lines in FIG. 23 are different from those of the filling weld lines FIG. 24. The molding material 16 entering the mold cavity 25 through different valve gates 53A-53I forms a plurality of flow streams with each having a melt front, and each of the filling weld lines is formed by two of the melt fonts contacting each other. The comparative filling rates of the molding material 16 passing through the valve gates 53A-53I shown in FIG. 21 is different from the exemplary filling rates shown in FIG. 22, therefore, the corresponding velocities of the flow streams are different, and the melt fronts of the flow streams are different; consequently, the positions of the filling weld lines are different.

In some embodiments, the at least one flow parameter of the molding material 16 in the tube 11 is generated by taking into consideration the dynamic movement of the pusher 15 in the tube 11, the volume variation of the molding material 16 in the tube 11, or the combination thereof; and, the at least one flow parameter of the molding material 16 in the tube 11 is then used to specify the boundary conditions of the simulation domain. As a result, the present disclosure can accurately simulate the phenomena occurring within the mold cavity 25, so as to implement the optimization of the molding conditions and stable molding of non-defective products.

In some embodiments, the generating of the at least one flow parameter of the molding material 16 in the tube (barrel) 11 includes calculating a dynamic variation for a filling rate of the molding material 16 that is injected into the mold cavity 25, and the filling rate of the molding material 16 is used to calculate a flow velocity of the molding material 16 that is injected into the mold cavity 25 from the tube (barrel) 11.

In some embodiments, the filling rate of the molding material 16 (the amount of the molding material 16 transferred into the mold cavity 25 by the pusher 15 in the tube 11) depends on the movement of the screw 15. In some embodiments, the present disclosure may acquire the measured waveform of the movement of the screw 15 to simulate the molding phenomena of the molding material 16 that is injected into the mold cavity 25 by the screw 15 in the barrel 11.

In some embodiments, the filling rate of the molding material 16 (the amount of the molding material 16 transferred into the mold cavity 25 by the pusher 15 in the tube 11) also depends on the volume variation of the molding material 16 with respect to the temperature and pressure. In some embodiments, the volume variation for calculating the at least one flow parameter of the molding material 16 is a compressibility of the molding material 16 with respect to the pressure, a shrinkage of the molding material 16 with respect to the temperature, or the combination thereof.

In some embodiments, a computer-implemented simulation method is disclosed for use in molding process by a computer processor, and the simulation method includes specifying a simulating domain having a mold cavity configured to connect a tube of a molding machine, creating a mesh by dividing at least part of the simulating domain, generating at least one flow parameter of a molding material in the tube, specifying boundary conditions of the mesh by taking into consideration the at least one flow parameter of the molding material, and simulating a molding process of the molding material that is injected into the mold cavity by using the boundary conditions to generate a plurality of molding conditions.

In some embodiments, a non-transitory computer medium contains computer instructions stored therein for causing a computer processor to perform operations for use in molding process simulation, and the operations includes specifying a simulating domain having a mold cavity configured to connect a tube of a molding machine, creating a mesh by dividing at least part of the simulating domain, generating at least one flow parameter of a molding material in the tube, specifying boundary conditions of the mesh by taking into consideration the at least one flow parameter of the molding material, and simulating a molding process of the molding material that is injected into the mold cavity by using the boundary conditions to generate a plurality of molding conditions.

In some embodiments, a molding system includes a mold having a mold cavity, a molding machine having a tube with a pusher therein configured to push a molding material into the mold cavity and a computer processor associated with the molding machine. In some embodiments, the computer processor is configured to perform operations for a molding process simulation, and the operations includes specifying a simulating domain having a mold cavity configured to connect a tube of a molding machine, creating a mesh by dividing at least part of the simulating domain, generating at least one flow parameter of a molding material in the tube, specifying boundary conditions of the mesh by taking into consideration the at least one flow parameter of the molding material, and simulating a molding process of the molding material that is injected into the mold cavity by using the boundary conditions to generate a plurality of molding conditions.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computer-implemented simulation method for use in molding process by a computer processor, comprising:
    specifying a simulating domain having a mold cavity configured to connect a tube of a molding machine, the tube and the mold cavity being two individual parts;
    creating a mesh by dividing at least part of the simulating domain;
    generating at least one flow parameter of a molding material in the tube, the at least one flow parameter comprising a filling rate of the molding material, wherein
        the step of generating at least one flow parameter of a molding material in the tube being performed by taking into consideration a dynamic movement of a pusher in the tube, a volume variation of the molding material in the tube, or the combination thereof;
        the dynamic movement of the pusher is a moving speed of the pusher in the tube with respect to an injection time or a position of the pusher in the tube with respect to the injection time; and
        an amount of the molding material injected into the mold cavity by the pusher in tube of the molding machine being governed by an equation of mass conservation expression shown below:
        $\int \rho \cdot dV|_{t=t_1} = \int \rho \cdot dV|_{t=t_1+\Delta t} + \int_{t_1}^{t_1+\Delta t} \rho \cdot FR \cdot dt$, wherein $t_1$ and $t_1+\Delta t$ are different injection times, FR represents the filling rate of the molding material, $\rho$ represents density of the molding material, V represents volume of the molding material, dt represents an increment of time, dV represents an increment of volume, and
        the equation of mass conservation expression in an algebraic form being:
        $\rho^t \cdot V^t = \rho^{t+dt} \cdot (V^{t+dt} + FR^{t+dt} \cdot dt)$, wherein $\rho^t$ and $\rho^{t+dt}$ represent densities (inverse of specific volumes) of the molding material at the different injection times, $V^t$ and $V^{t+dt}$ represent volumes of the molding material at the different injection times, dt represents an increment of time, and $FR^{t+dt}$ represents a filling rate of the molding material;
    specifying boundary conditions of the mesh by taking into consideration the at least one flow parameter of the molding material, the boundary conditions comprising a flow velocity of the molding material that is injected into the mold cavity from the tube of the injection machine; and
    simulating a molding process of the molding material that is injected into the mold cavity by using the boundary conditions to generate a plurality of molding conditions.

2. The computer-implemented simulation method for use in molding process of claim 1, wherein the volume variation is a compressibility of the molding material with respect to the pressure, a shrinkage of the molding material with respect to the temperature, or the combination thereof.

3. The computer-implemented simulation method for use in molding process of claim 1, wherein the step of generating at least one flow parameter of the molding material in the tube comprises calculating a dynamic variation for the filling rate of the molding material that is injected into the mold cavity.

4. The computer-implemented simulation method for use in the molding process of claim 3, wherein the step of specifying boundary conditions of the mesh by taking into consideration the at least one flow parameter of the molding material comprises calculating the flow velocity of the molding material that is injected into the mold cavity from the tube by taking into consideration the dynamic variation for the filling rate of the molding material.

5. A non-transitory computer medium containing computer instructions stored therein for causing a computer processor to perform operations for use in molding process simulation, the operations comprising:
    specifying a simulating domain having a mold cavity configured to connect a tube of a molding machine, the tube and the mold cavity being two individual parts;
    creating a mesh by dividing at least part of the simulating domain;

generating at least one flow parameter of a molding material in the tube, the at least one flow parameter comprising a filling rate of the molding material, wherein the operation of generating at least one flow parameter of a molding material in the tube being performed by taking into consideration a dynamic movement of a pusher in the tube, a volume variation of the molding material in the tube, or the combination thereof;

the dynamic movement of the pusher is a moving speed of the pusher in the tube with respect to an injection time or a position of the pusher in the tube with respect to the injection time; and an amount of the molding material injected into the mold cavity by the pusher in tube of the molding machine being governed by an equation of mass conservation expression shown below:

$\int \rho \cdot dV|_{t=t_1} = \int \rho \cdot dV|_{t=t_1+\Delta t} + \int_{t_1}^{t_1+\Delta t} \rho \cdot FR \cdot dt$, wherein $t_1$ and $t_1+\Delta t$ are different injection times, FR represents the filling rate of the molding material, $\rho$ represents density of the molding material, V represents volume of the molding material, dt represents an increment of time, dV represents an increment of volume, and the equation of mass conservation expression in an algebraic form being:

$\rho^t \cdot V^t = \rho^{t+dt} \cdot (V^{t+dt} + FR^{t+dt} \cdot dt)$, wherein $\rho^t$ and $\rho^{t+dt}$ represent densities (inverse of specific volumes) of the molding material at the different injection times, $V^t$ and $V^{t+dt}$ represent volumes of the molding material at the different injection times, dt represents an increment of time, and $FR^{t+dt}$ represents a filling rate of the molding material;

specifying boundary conditions of the mesh by taking into consideration the at least one flow parameter of the molding material, the boundary conditions comprising a flow velocity of the molding material that is injected into the mold cavity from the tube of the injection machine; and simulating a molding process of the molding material that is injected into the mold cavity by using the boundary conditions to generate a plurality of molding conditions.

6. The non-transitory computer medium of claim 5, wherein the volume variation is a compressibility of the molding material with respect to the pressure, a shrinkage of the molding material with respect to the temperature, or the combination thereof.

7. The non-transitory computer medium of claim 5, wherein the operation of generating at least one flow parameter of the molding material in the tube comprises calculating a dynamic variation for the filling rate of the molding material that is injected into the mold cavity.

8. The non-transitory computer medium of claim 7, wherein the operation of specifying boundary conditions of the mesh by taking into consideration the at least one flow parameter of the molding material comprises calculating the flow velocity of the molding material that is injected into the mold cavity from the tube by taking into consideration the dynamic variation for the filling rate of the molding material.

9. A molding system, comprising:
a mold having a mold cavity;
a molding machine having a tube with a pusher therein configured to push a molding material into the mold cavity; and
a computer processor connected with the molding machine, wherein the computer processor is configured to perform operations for a molding process simulation, and the computer processor is configured to receive a dynamic movement information of a pusher in the tube through a connection of the computer processor and the molding machine, the operations comprising:

specifying a simulating domain having the mold cavity;
creating a mesh by dividing at least part of the simulating domain;
generating at least one flow parameter of the molding material in the tube, the at least one flow parameter comprising a filling rate of the molding material, wherein the computer processor is configured for generating of the at least one flow parameter of the molding material in the tube by taking into consideration a dynamic movement of a pusher in the tube, a volume variation of the molding material in the tube, or the combination thereof;

the dynamic movement of the pusher is a moving speed of the pusher in the tube with respect to an injection time or a position of the pusher in the tube with respect to the injection time; and an amount of the molding material injected into the mold cavity by the pusher in tube of the molding machine being governed by an equation of mass conservation expression shown below:

$\int \rho \cdot dV|_{t=t_1} = \int \rho \cdot dV|_{t=t_1+\Delta t} + \int_{t_1}^{t_1+\Delta t} \rho \cdot FR \cdot dt$, wherein $t_1$ and $t_1+\Delta t$ are different injection times, FR represents the filling rate of the molding material, $\rho$ represents density of the molding material, V represents volume of the molding material, dt represents an increment of time, dV represents an increment of volume, and the equation of mass conservation expression in an algebraic form being:

$\rho^t \cdot V^t = \rho^{t+dt} \cdot (V^{t+dt} + FR^{t+dt} \cdot dt)$, wherein $\rho^t$ and $\rho^{t+dt}$ represent densities (inverse of specific volumes) of the molding material at the different injection times, $V^t$ and $V^{t+dt}$ represent volumes of the molding material at the different injection times, dt represents an increment of time, and $FR^{t+dt}$ represents a filling rate of the molding material;

specifying boundary conditions of the mesh by taking into consideration the at least one flow parameter of the molding material, the boundary conditions comprising a flow velocity of the molding material that is injected into the mold cavity from the tube of the injection machine; and simulating a molding process of the molding material that is injected into the mold cavity by using the boundary conditions to generate a plurality of molding conditions.

10. The molding system of claim 9, wherein the connection is a hard wire connection or a wireless connection.

11. The molding system of claim 9, wherein the volume variation is a compressibility of the molding material with respect to the pressure, a shrinkage of the molding material with respect to the temperature, or the combination thereof.

12. The molding system of claim 9, wherein the dynamic movement of the pusher is a moving speed of the pusher in the tube with respect to an injection time or a position of the pusher in the tube with respect to the injection time.

13. The molding system of claim 9 wherein the computer processor is configured for generating the at least one flow parameter of the molding material in the tube by calculating a dynamic variation for the filling rate of the molding material that is injected into the mold cavity.

14. The molding system of claim 13, wherein the computer processor is configured for specifying boundary conditions of the mesh by taking into consideration the at least one flow parameter of the molding material by calculating the flow velocity of the molding material that is injected into the mold cavity from the tube by taking into consideration the dynamic variation for the filling rate of the molding material.

* * * * *